(12) United States Patent
He et al.

(10) Patent No.: US 12,242,748 B2
(45) Date of Patent: Mar. 4, 2025

(54) INTERMEDIARY FOR STORAGE COMMAND TRANSFERS

(71) Applicant: Intel Corporation, Santa Clara, CA (US)

(72) Inventors: Shaopeng He, Shanghai (CN); Yadong Li, Portland, OR (US); Ziye Yang, Shanghai (CN); Changpeng Liu, Shanghai (CN); Banghao Ying, Wenzhou (CN); Robert O. Sharp, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 735 days.

(21) Appl. No.: 16/909,693

(22) Filed: Jun. 23, 2020

(65) Prior Publication Data
US 2020/0319812 A1    Oct. 8, 2020

Related U.S. Application Data

(60) Provisional application No. 63/034,321, filed on Jun. 3, 2020.

(51) Int. Cl.
*G06F 12/00* (2006.01)
*G06F 3/06* (2006.01)
*G06F 13/00* (2006.01)

(52) U.S. Cl.
CPC .......... *G06F 3/0644* (2013.01); *G06F 3/0604* (2013.01); *G06F 3/0629* (2013.01);
(Continued)

(58) Field of Classification Search
CPC .... G06F 3/0644; G06F 3/0604; G06F 3/0629; G06F 3/0659; G06F 3/0665; G06F 3/067; G06F 3/0683
(Continued)

(56) References Cited

U.S. PATENT DOCUMENTS 6,385,727 B1 * 5/2002 Cassagnol ............... G06F 21/57
                                                        713/168
6,732,138 B1 * 5/2004 Browning ............... G06F 9/468
                                                        718/107
(Continued)

FOREIGN PATENT DOCUMENTS

WO     2016196766 A2    12/2016

OTHER PUBLICATIONS

International Search Report and Written Opinion for PCT Patent Application No. PCT/US20/64674, Mailed Apr. 7, 2021, 10 pages.
(Continued)

*Primary Examiner* — Sheng Jen Tsai
(74) *Attorney, Agent, or Firm* — Compass IP Law PC

(57) ABSTRACT

Examples described herein relate to accessing an initiator as a Non-Volatile Memory Express (NMVe) device. In some examples, the initiator is configured with an address space, configured in kernel or user space, for access by a virtualized execution environment. In some examples, the initiator to copy one or more storage access commands from the virtualized execution environment into a queue for access by a remote direct memory access (RDMA) compatible network interface. In some examples, the network interface to provide Non-Volatile Memory Express over Fabrics (NVMe-oF) compatible commands based on the one or more storage access commands to a target storage device. In some examples, the initiator is created as a mediated device in kernel space or user space of a host system. In some examples, configuration of a physical storage pool address of the target storage device for access by the virtualized execution environment occurs by receipt of the physical storage pool address in a configuration command. In some examples, configuration of the target storage device for access by the virtualized execution environment occurs by
(Continued)

receipt of a storage pool internal NVMe Qualified Name in the configuration command.

17 Claims, 25 Drawing Sheets

(52) U.S. Cl.
CPC .......... *G06F 3/0659* (2013.01); *G06F 3/0665* (2013.01); *G06F 3/067* (2013.01); *G06F 3/0683* (2013.01)

(58) Field of Classification Search
USPC .......................................................... 711/154
See application file for complete search history.

(56) References Cited

U.S. PATENT DOCUMENTS

| | | | | |
|---|---|---|---|---|
| 7,782,869 | B1* | 8/2010 | Chitlur Srinivasa | ........................ H04L 49/9047 370/401 |
| 7,783,788 | B1* | 8/2010 | Quinn | .................... G06F 9/5077 711/170 |
| 9,747,039 | B1* | 8/2017 | Coleman | ............... G06F 9/4881 |
| 10,817,353 | B1* | 10/2020 | Kain | ....................... G06F 9/545 |
| 11,625,169 | B2* | 4/2023 | Chen | ..................... G06F 3/0653 711/162 |
| 2001/0044886 | A1* | 11/2001 | Cassagnol | ........... G06F 21/6245 711/163 |
| 2004/0091114 | A1* | 5/2004 | Carter | .................... G06F 21/606 380/259 |
| 2005/0015702 | A1* | 1/2005 | Shier | .................... G06F 11/2273 714/776 |
| 2005/0210479 | A1* | 9/2005 | Andjelic | ................. H04L 49/90 719/321 |
| 2006/0248234 | A1* | 11/2006 | Pope | ....................... H04L 63/10 709/250 |
| 2007/0288719 | A1* | 12/2007 | Cholleti | ................ G06F 12/023 711/170 |
| 2012/0151184 | A1* | 6/2012 | Wilkerson | .............. G06F 8/447 712/E9.016 |
| 2012/0331480 | A1 | 12/2012 | Ertugay et al. | |
| 2013/0132702 | A1* | 5/2013 | Patel | ..................... G06F 12/109 711/202 |
| 2013/0283017 | A1* | 10/2013 | Wilkerson | .............. G06F 9/322 712/225 |
| 2013/0346709 | A1* | 12/2013 | Wang | ................. G06F 11/1456 711/E12.103 |
| 2014/0258438 | A1 | 9/2014 | Ayoub | |
| 2014/0365971 | A1* | 12/2014 | Laadan | ................. H04L 67/306 715/835 |
| 2014/0372717 | A1* | 12/2014 | Ciu | ....................... G06F 21/566 711/162 |
| 2015/0178111 | A1* | 6/2015 | Warszawski | .......... G06F 9/4881 718/1 |
| 2015/0220354 | A1* | 8/2015 | Nair | ....................... G06F 3/061 710/308 |
| 2016/0117497 | A1* | 4/2016 | Saxena | ................. G06F 21/566 726/26 |
| 2016/0117498 | A1* | 4/2016 | Saxena | ................. G06F 21/445 726/26 |
| 2016/0328562 | A1* | 11/2016 | Saxena | ................. G06F 21/566 |
| 2016/0378529 | A1* | 12/2016 | Wen | ..................... H04L 63/1441 718/1 |
| 2017/0060613 | A1* | 3/2017 | Warkentin | .......... G06F 9/45545 |
| 2017/0177541 | A1 | 6/2017 | Berman et al. | |
| 2017/0187496 | A1 | 6/2017 | Shalev et al. | |
| 2017/0235614 | A1* | 8/2017 | Choe | ..................... G06F 9/5044 718/104 |
| 2017/0344406 | A1* | 11/2017 | Yamaura | ............. G06F 9/45545 |
| 2018/0152494 | A1* | 5/2018 | Wilson | .................. G06F 3/165 |
| 2018/0152495 | A1* | 5/2018 | Wilson | .................. H04L 65/61 |
| 2018/0152496 | A1* | 5/2018 | Wilson | .................. H04L 65/765 |
| 2018/0152511 | A1* | 5/2018 | Wilson | .................... H04L 65/75 |
| 2018/0219797 | A1 | 8/2018 | Sen et al. | |
| 2019/0042263 | A1* | 2/2019 | Sukhomlinov | ....... G06F 9/3867 |
| 2019/0042417 | A1* | 2/2019 | Sukhomlinov | ..... G06F 12/0875 |
| 2019/0146718 | A1* | 5/2019 | Ben Dayan | ............. G06F 3/067 711/154 |
| 2019/0297015 | A1 | 9/2019 | Marolia et al. | |
| 2019/0306282 | A1* | 10/2019 | Masputra | ............ G06F 9/44526 |
| 2019/0377863 | A1* | 12/2019 | Zhao | ...................... G06F 21/36 |
| 2019/0384532 | A1 | 12/2019 | Ananthapalli et al. | |
| 2019/0385271 | A1* | 12/2019 | Ben Dayan | ......... G06F 16/1847 |
| 2020/0042177 | A1* | 2/2020 | Benisty | ................. G06F 3/0659 |
| 2020/0073689 | A1* | 3/2020 | Tsirkin | .................. G06F 3/0673 |
| 2020/0073846 | A1 | 3/2020 | Adiletta et al. | |
| 2020/0133497 | A1* | 4/2020 | Meiri | .................. G06F 11/2082 |
| 2020/0133909 | A1* | 4/2020 | Hefty | .................... H04L 45/566 |
| 2020/0136996 | A1* | 4/2020 | Li | ........................ G06F 12/1081 |
| 2020/0150734 | A1* | 5/2020 | Ma | .......................... G06F 9/544 |
| 2020/0293465 | A1* | 9/2020 | Yang | ...................... H04L 49/35 |
| 2021/0019270 | A1* | 1/2021 | Li | ....................... G06F 13/1668 |
| 2021/0342215 | A1* | 11/2021 | Chawla | ................ G06F 11/079 |
| 2021/0342273 | A1* | 11/2021 | Patel | ................... G06F 12/1036 |
| 2021/0342298 | A1* | 11/2021 | Mathews | .............. G06F 16/128 |

OTHER PUBLICATIONS

Fair, David, et al., "How Ethernet RDMA Protocols iWARP and RoCE Support NVMe over Fabrics", SNIA Europe, Topic, Jun. 2016, 2 pages.

Guz, Zvika, et al., "Performance Characterization of NVMe-over-Fabrics Storage Disaggregation", ACM Transactions on Storage, vol. 14, No. 4, Article 31. Publication date: Dec. 2018, 18 pages.

Johnson, John, "Disaggregating QEMU", https://github.com/oracle/qemu/blob/multi-process-qemu-v0.5/docs/devel/qemu-multiprocess.rst, Aug. 19, 2019, 26 pages.

KVM Forum, "Muser: Mediated User Space Device", https://kvmforum2019.sched.com/event/TmvV, Nov. 1, 2019, 2 pages.

KVM Forum, "Post-copy Live Migration on Pass-through Devices", https://kvmforum2019.sched.com/event/TmvG, Nov. 1, 2019, 2 pages.

Lureau, Marc-Andre, "libvfio library", Copyright (c) 2017 Red Hat, Inc., https://github.com/elmarco/qemu/blob/wip/vfio-user/hw/vfio/libvfio-user.com, Oct. 20, 2017, 13 pages.

Makatos, T., "framework for emulating devices in userspace", https://github.com/nutanix/libvfio-user, downloaded Aug. 15, 2022, 8 pages.

Makatos, Thanos, et al., "MUSER: mediated userspace device" Nutanix, KVM Forum, Oct. 2019, 16 pages.

Makatos, Thomas, "RFC: use VFIO over a UNIX domain socket to implement device offloading", https://lists.gnu.org/archive/html/qemu-devel/2020-03/msg07900.html, Mar. 26, 2020, 2 pages.

NVM Express, "NVM Express Base Specification", Revision 1.4, Jun. 10, 2019, 403 pages.

Williamson, Alex, "An Introduction to PCI Device Assignment with VFIO", redhat, Sep. 1, 2016, 118 pages.

Williamson, Alex, "VFIO: A user's perspective", redhat, KVM Forum 2012, Nov. 8, 2012, 38 pages.

"Errata for the Compute Express Link™ (CXL™) Specification Rev. 1.1", CXL\Compute Express Link™, Feb. 2020, 34 pages.

"Errata for the Compute Express Link™ (CXL™) Specification Rev. 1.1", CXL\Compute Express Link™, Jun. 2019, 250 pages.

"Gen Z Core Specification Version 1.0", Copyright 2016-2018 by Gen-Z Consortium., 983 pages.

"Quick Concepts Part 1—Introduction to RDMA", ZCopy education and Sample Code for RDMA Programming, taken from the internet, https://zcopy.wordpress.com/2010/10/08/quick-concepts-part-1-%e2%80%93-introduction-to-rdma/, posted Oct. 8, 2010, 7 pages.

"Swordfish Scalable Storage Management API Specification", Version 1.1.0a. Swordfish SNIA, Technical Position, Last Updated Nov. 12, 2019, 149 pages.

Advisory Action for U.S. Appl. No. 16/701,026, Mailed Aug. 22, 2023, 3 pages.

Final Office Action for U.S. Appl. No. 16/701,026, Mailed May 5, 2023, 33 pages.

(56) References Cited

OTHER PUBLICATIONS

Final Office Action for U.S. Appl. No. 16/701,026, Mailed Jan. 13, 2023, 26 pages.
Intel, "PCI Express* Ethernet Networking" White Paper, Intel PRO Network Adapters, Network Performance, Network Connectivity, Sep. 2005, 6 pages.
Extended European Search Report for Patent Application No. 20938837.0, Mailed May 22, 2024, 8 pages.

* cited by examiner

INTERMEDIARY FOR STORAGE COMMAND TRANSFERS

RELATED APPLICATION

The present application claims the benefit of priority date of U.S. provisional patent application Ser. No. 63/034,321, filed Jun. 3, 2020, the entire disclosure of which is incorporated herein by reference.

DESCRIPTION

The Non-Volatile Memory Express (NVMe) Specification describes a system for accesses to data storage systems through a Peripheral Component Interconnect Express (PCIe) port. NVMe is described for example, in NVM Express™ Base Specification, Revision 1.3c (2018), as well as predecessors, successors, and proprietary variations thereof, which are incorporated by reference in their entirety. NVMe allows a host device to specify regions of storage as separate namespaces. A namespace can be an addressable domain in a non-volatile memory having a selected number of storage blocks that have been formatted for block access. A namespace can include an addressable portion of a media in a solid state drive (SSD), or a multi-device memory space that spans multiple SSDs or other data storage devices. A namespace ID (NSID) can be a unique identifier for an associated namespace. A host device can access a particular non-volatile memory by specifying an NSID, a controller ID and an associated logical address for the block or blocks (e.g., logical block addresses (LBAs)).

DETAILED DESCRIPTION

Figure 1:
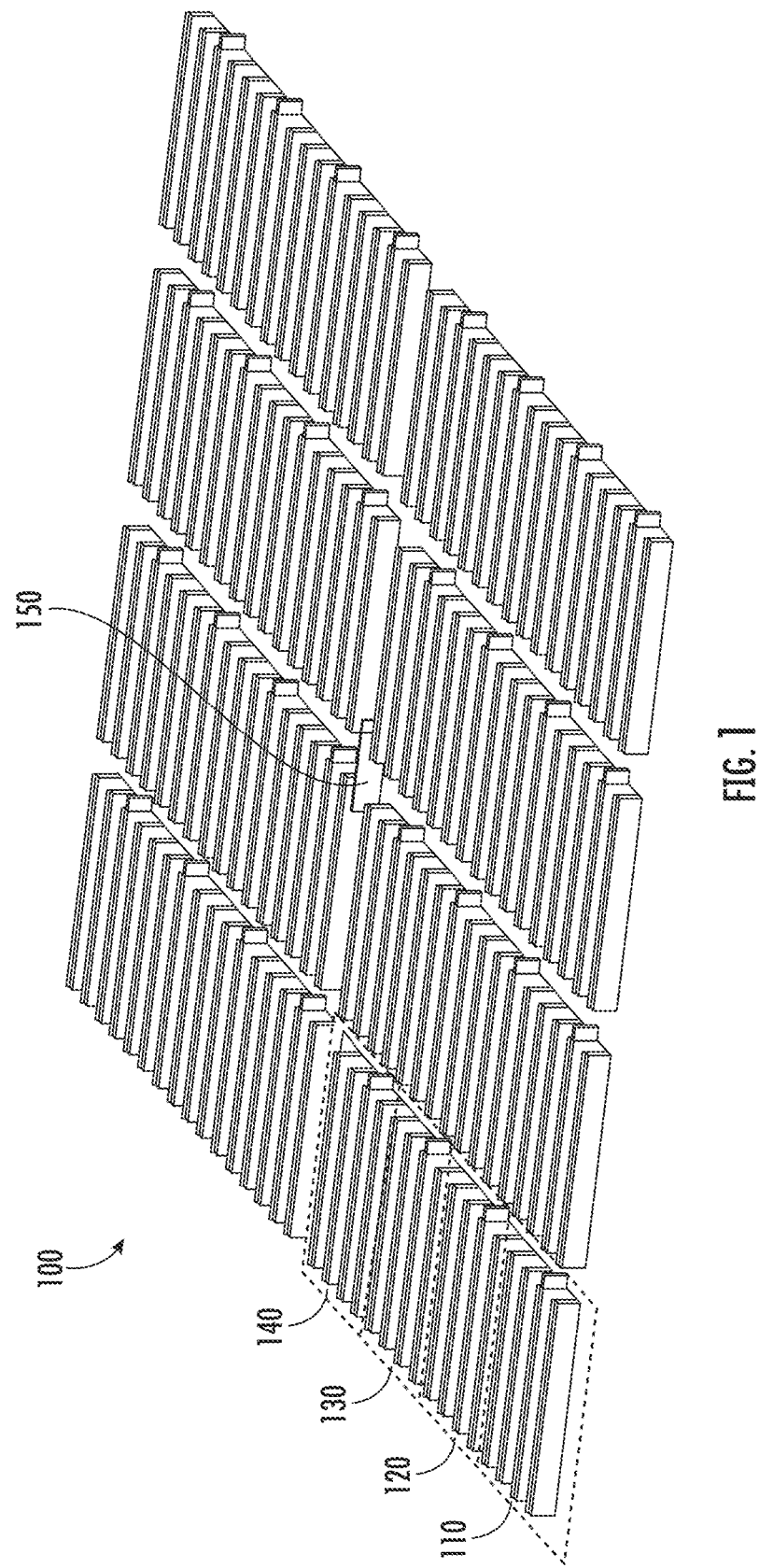
FIG. 1 is a simplified diagram of at least one embodiment of a data center for executing workloads with disaggregated resources.

FIG. 1 depicts a data center in which disaggregated resources may cooperatively execute one or more workloads (e.g., applications on behalf of customers) includes multiple pods 110, 120, 130, 140, a pod being or including one or more rows of racks. Of course, although data center 100 is shown with multiple pods, in some embodiments, the data center 100 may be embodied as a single pod. As described in more detail herein, each rack houses multiple sleds, each of which may be primarily equipped with a particular type of resource (e.g., memory devices, data storage devices, accelerator devices, general purpose processors), e.g., resources that can be logically coupled to form a composed node, which can act as, for example, a server. In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. In other embodiments, the sleds may be connected with other fabrics, such as InfiniB and or Ethernet. As described in more detail herein, resources within sleds in the data center 100 may be allocated to a group (referred to herein as a "managed node") containing resources from one or more sleds to be collectively utilized in the execution of a workload. The workload can execute as if the resources belonging to the managed node were located on the same sled. The resources in a managed node may belong to sleds belonging to different racks, and even to different pods 110, 120, 130, 140. As such, some resources of a single sled may be allocated to one managed node while other resources of the same sled are allocated to a different managed node (e.g., one processor assigned to one managed node and another processor of the same sled assigned to a different managed node).

A data center comprising disaggregated resources, such as data center 100, can be used in a wide variety of contexts, such as enterprise, government, cloud service provider, and communications service provider (e.g., Telco's), as well in a wide variety of sizes, from cloud service provider megadata centers that consume over 100,000 sq. ft. to single- or multi-rack installations for use in base stations.

The disaggregation of resources to sleds comprised predominantly of a single type of resource (e.g., compute sleds comprising primarily compute resources, memory sleds containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources in a single chassis. For example, because sleds predominantly contain resources of a particular type, resources of a given type can be upgraded independently of other resources. Additionally, because different resources types (processors, storage, accelerators, etc.) typically have different refresh rates, greater resource utilization and reduced total cost of ownership may be achieved. For example, a data center operator can upgrade the processors throughout their facility by only swapping out the compute sleds. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
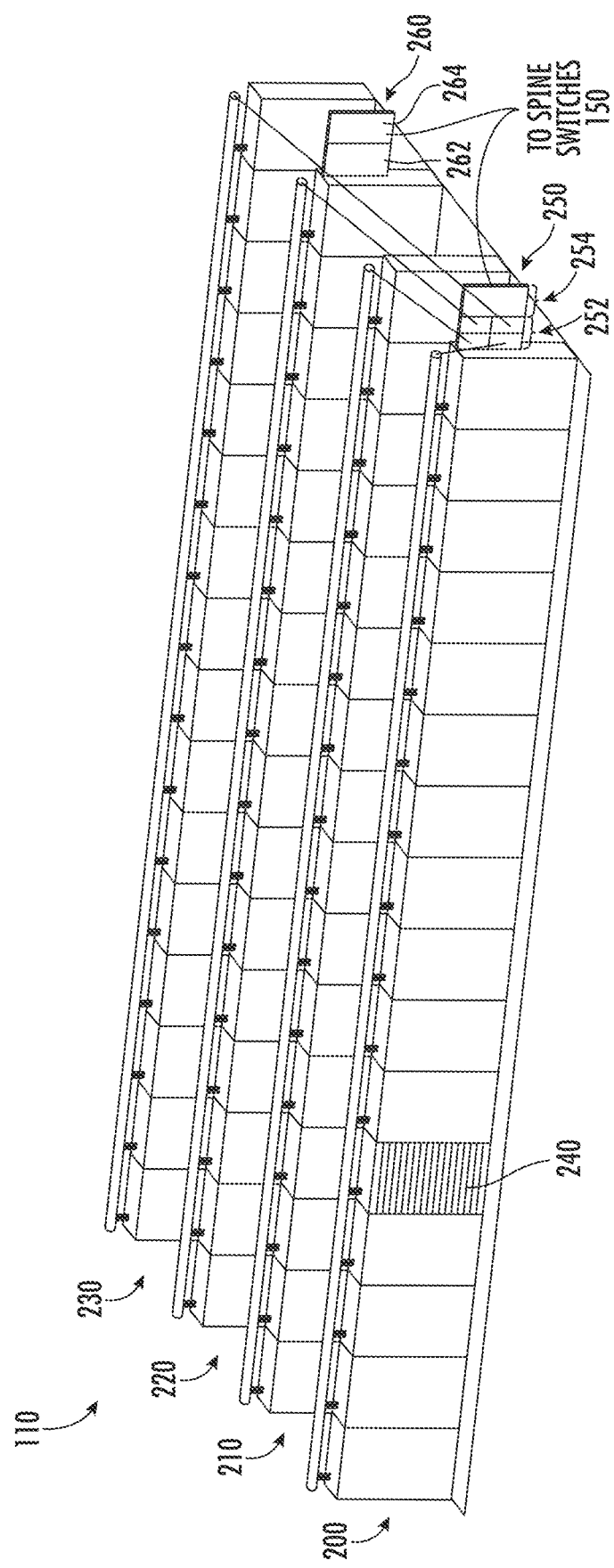
FIG. 2 is a simplified diagram of at least one embodiment of a pod that may be included in a data center.

FIG. 2 depicts a pod. A pod can include a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., PCI Express) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, e.g., the racks are equidistant from a center switch.

Figure 3:
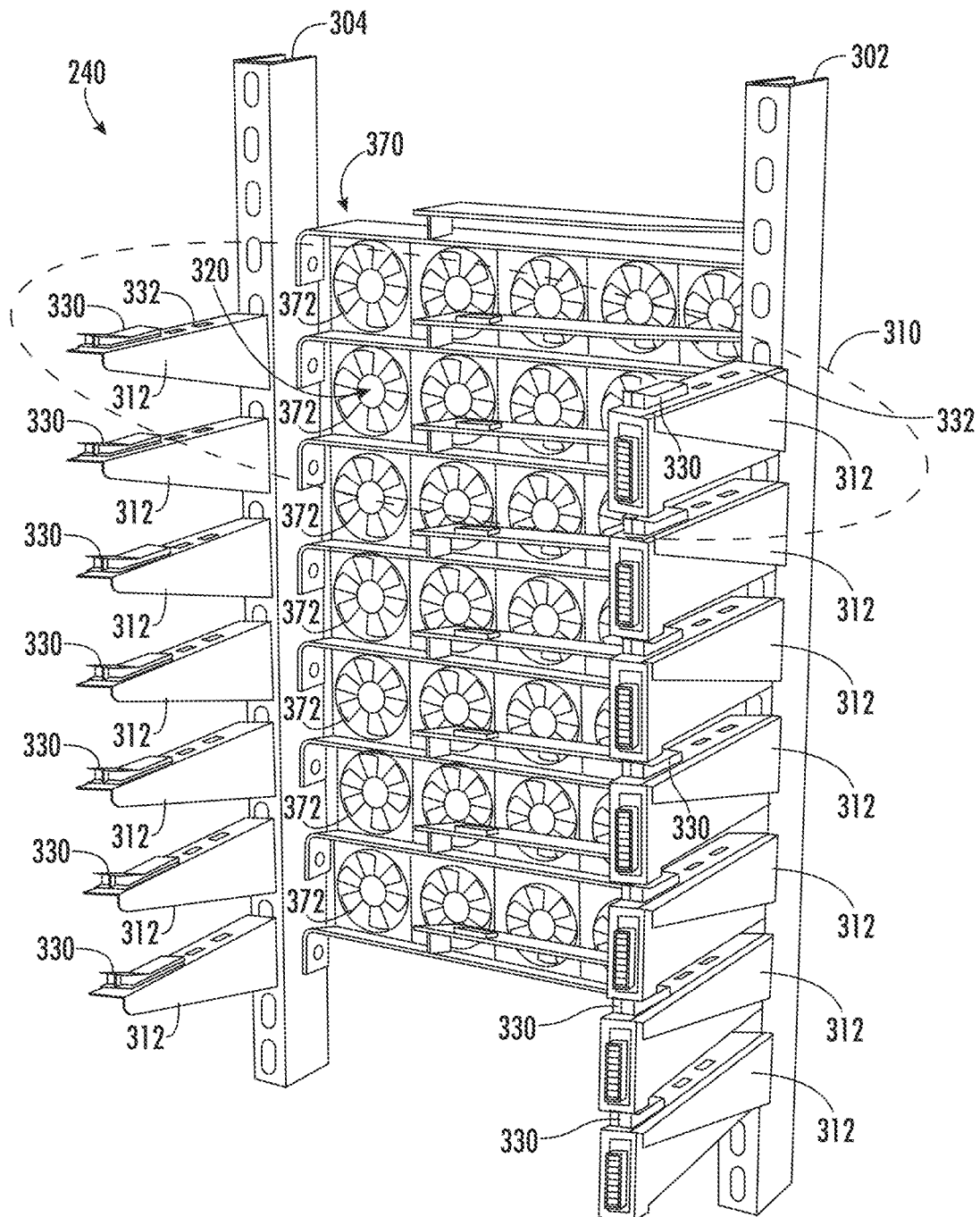
FIG. 3 is a perspective view of at least one embodiment of a rack that may be included in a pod.
Figure 4:
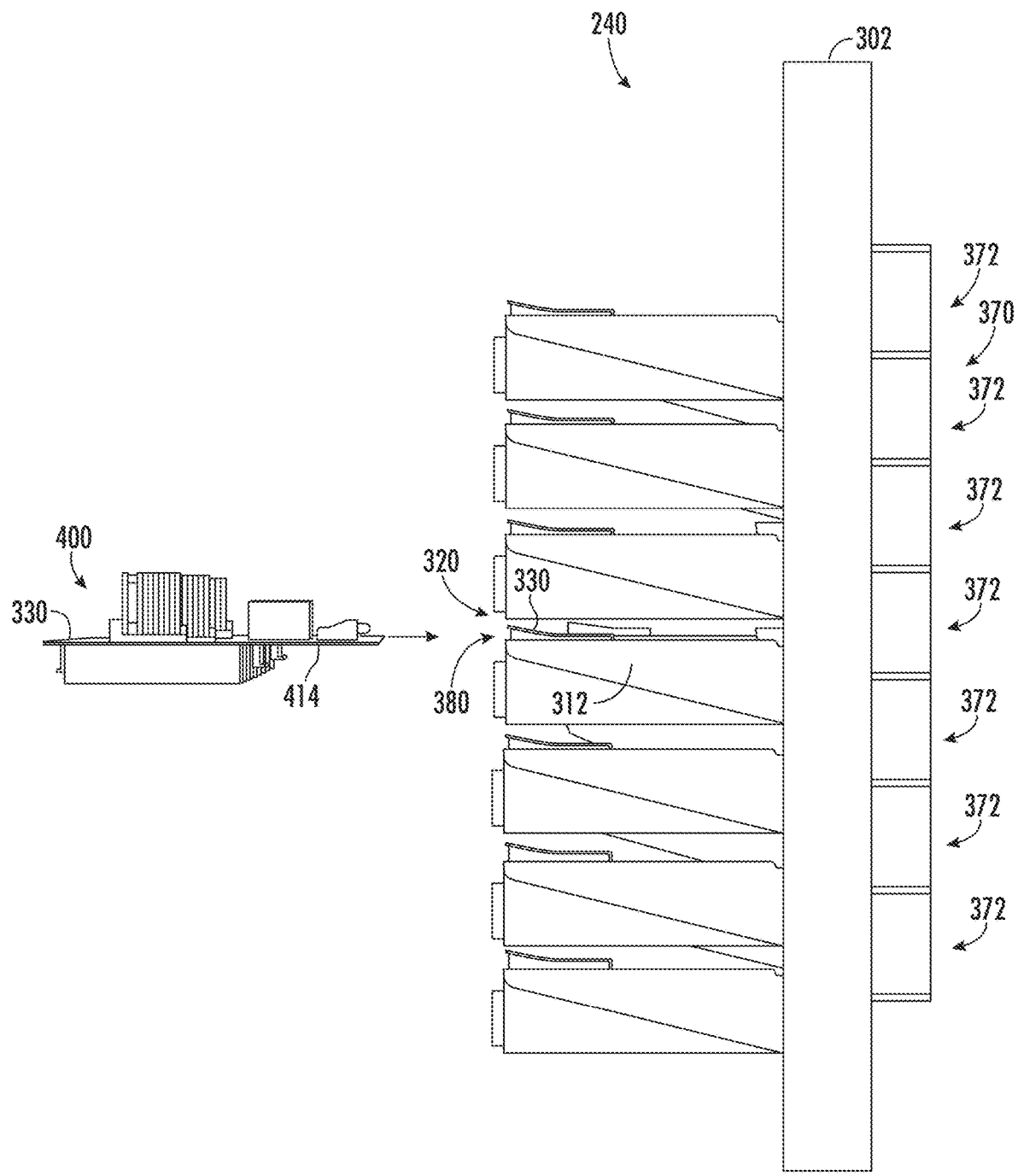
FIG. 4 is a side elevation view of a rack.
Figure 5:
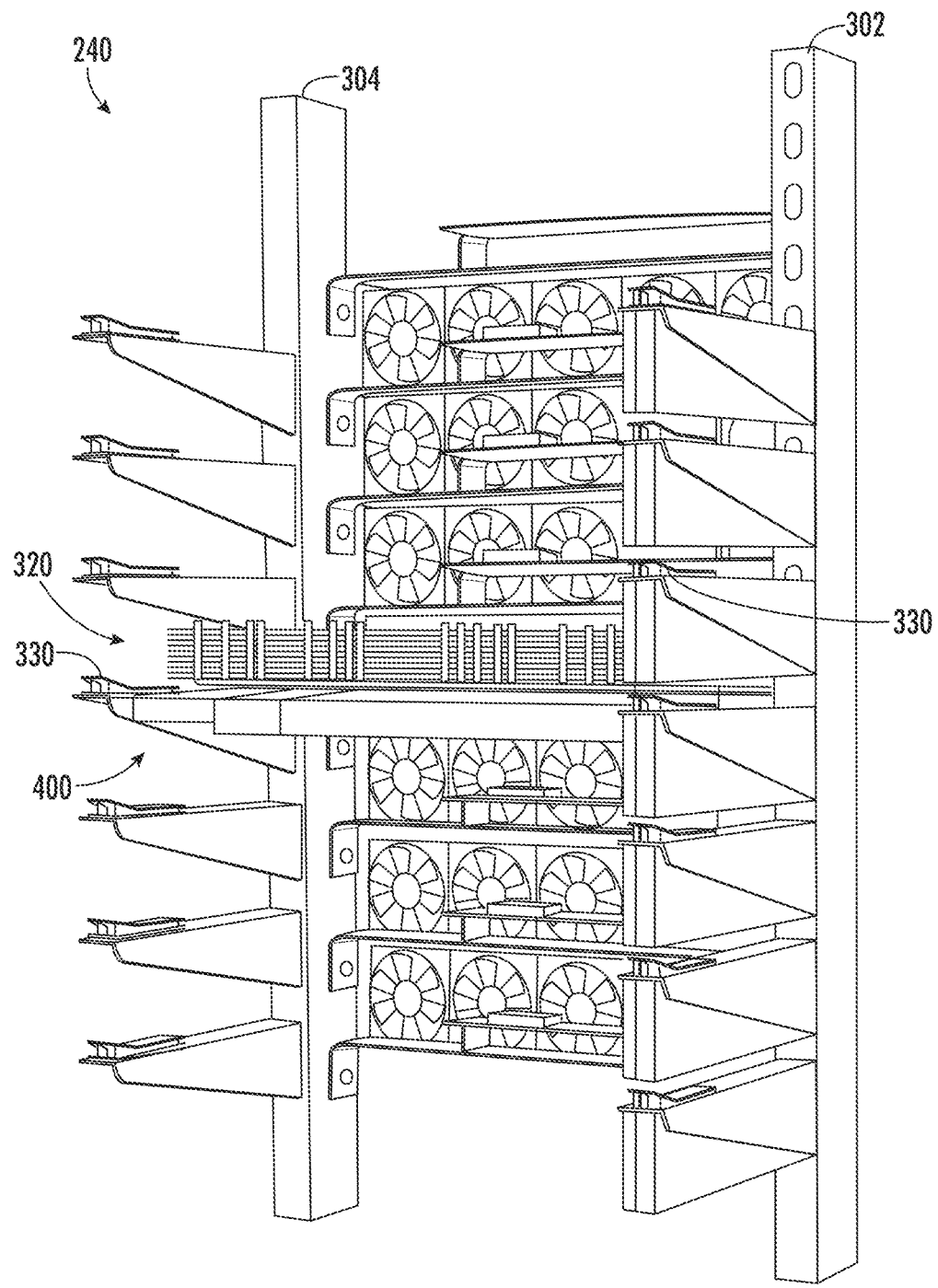
FIG. 5 is a perspective view of a rack having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulatable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (e.g., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1 U"). That is, the vertical distance between each pair 310 of elongated support arms 312 may be less than a standard rack unit "1 U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. For example, in some embodiments, the vertical distance between each pair 310 of elongated support arms 312 may be greater than a standard rack until "1 U". In such embodiments, the increased vertical distance between the sleds allows for larger heat sinks to be attached to the physical resources and for larger fans to be used (e.g., in the fan array 370 described below) for cooling each sled, which in turn can allow the physical resources to operate at increased power levels. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which interconnects may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable approaches or enters the connector mechanism. Subsequently, the optical fiber inside the cable may enter a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240.

Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240. Each power supply is configured to satisfy the power requirements for its associated sled, which can vary from sled to sled. Additionally, the power supplies provided in the rack 240 can operate independent of each other. That is, within a single rack, a first power supply providing power to a compute sled can provide power levels that are different than power levels supplied by a second power supply providing power to an accelerator sled. The power supplies may be controllable at the sled level or rack level, and may be controlled locally by components on the associated sled or remotely, such as by another sled or an orchestrator.

Figure 6:
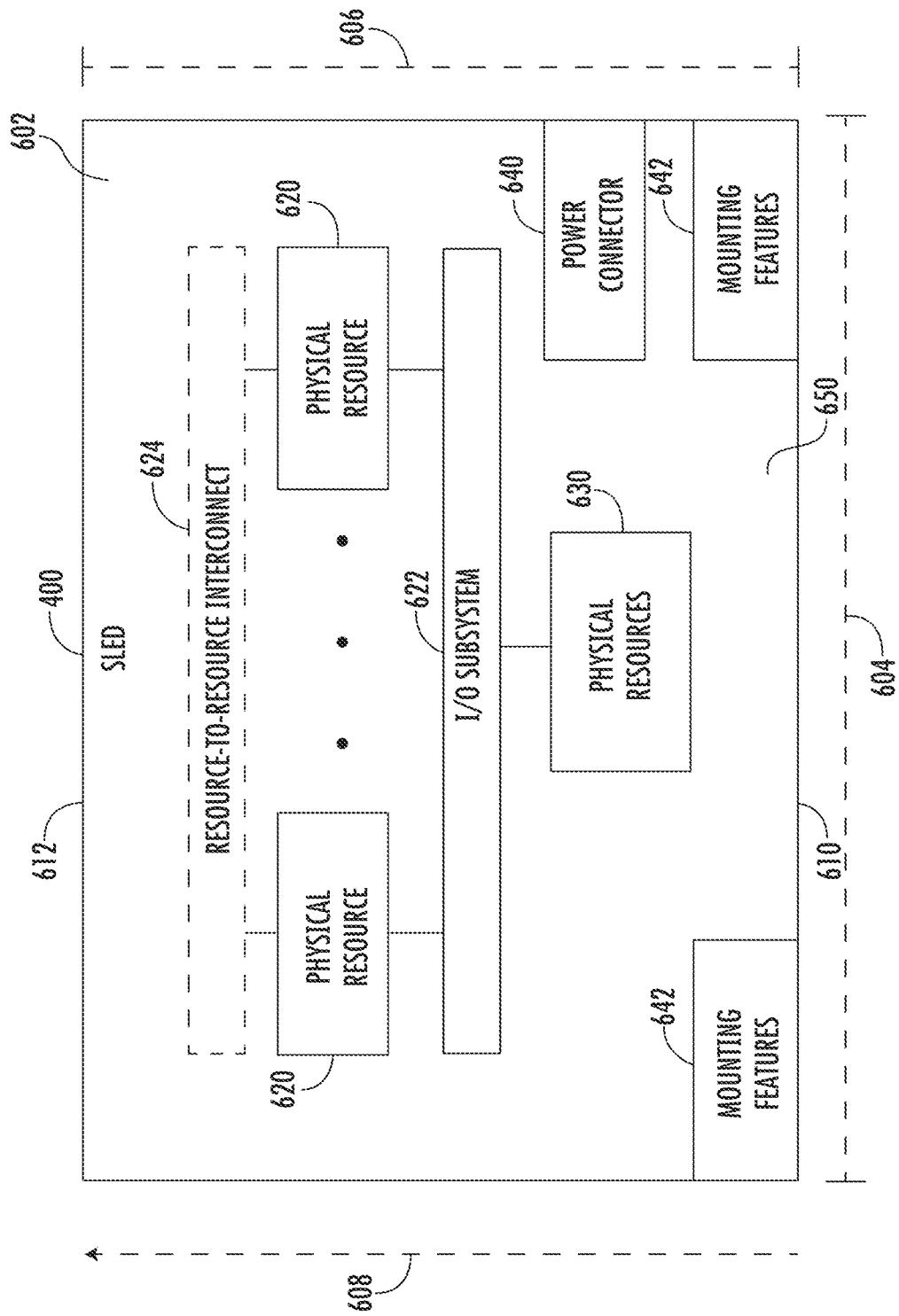
FIG. 6 is a simplified block diagram of at least one embodiment of a top side of a sled.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no vertically-arranged backplane (e.g., a backplate of the chassis) attached to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (e.g., greater than a nominal heat sufficient enough to adversely impact the cooling of another electrical component), are mounted to the chassis-less circuit board substrate 602 linearly in-line with each other along the direction of the airflow path 608 (e.g., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), PCI express (PCIe), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (e.g., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, voltage regulators are placed on a bottom side 750 (see FIG. 7) of the chassis-less circuit board substrate 602 directly opposite of the processors 820 (see FIG. 8), and power is routed from the voltage regulators to the processors 820 by vias extending through the circuit board substrate 602. Such a configuration provides an increased thermal budget, additional current and/or voltage, and better voltage control relative to typical printed circuit boards in which processor power is delivered from a voltage regulator, in part, by printed circuit traces.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
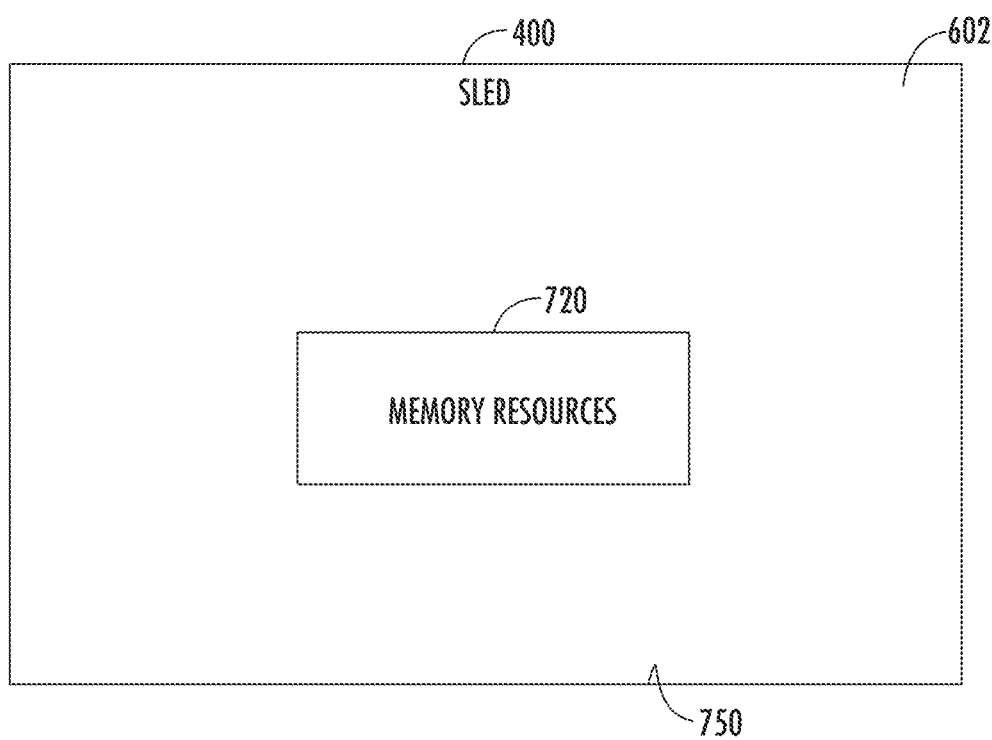
FIG. 7 is a simplified block diagram of at least one embodiment of a bottom side of a sled.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory device 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A block can be any size such as but not limited to 2 KB, 4 KB, 8 KB, and so forth. A memory device may also include next-generation nonvolatile devices, such as Intel Optane® memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 8:
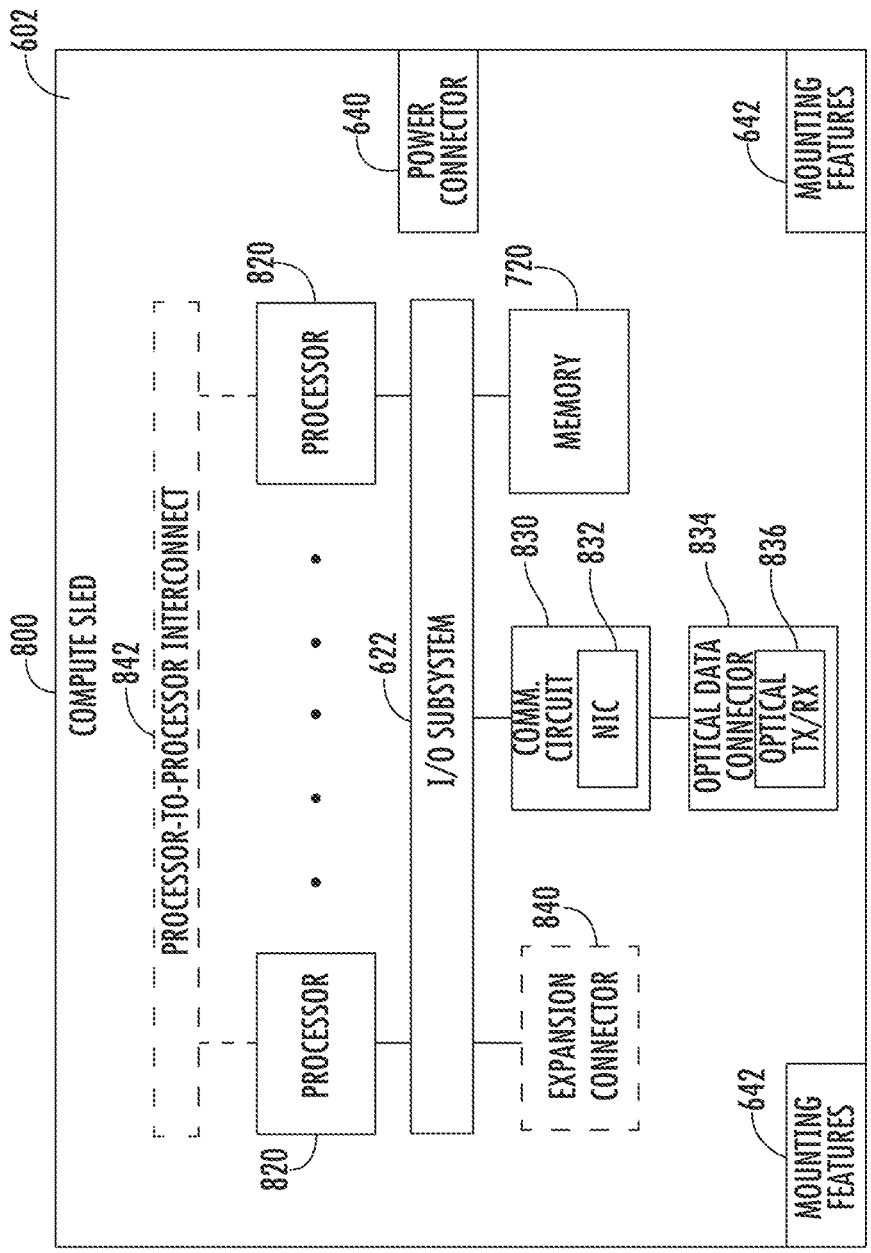
FIG. 8 is a simplified block diagram of at least one embodiment of a compute sled.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications (e.g., PCIe).

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, or other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels. In some examples, a network interface includes a network interface controller or a network interface card. In some examples, a network interface can include one or more of a network interface controller (NIC) 832, a host fabric interface (HFI), a host bus adapter (HBA), network interface connected to a bus or connection (e.g., PCIe, CXL, DDR, and so forth). In some examples, a network interface can be part of a switch or a system-on-chip (SoC).

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
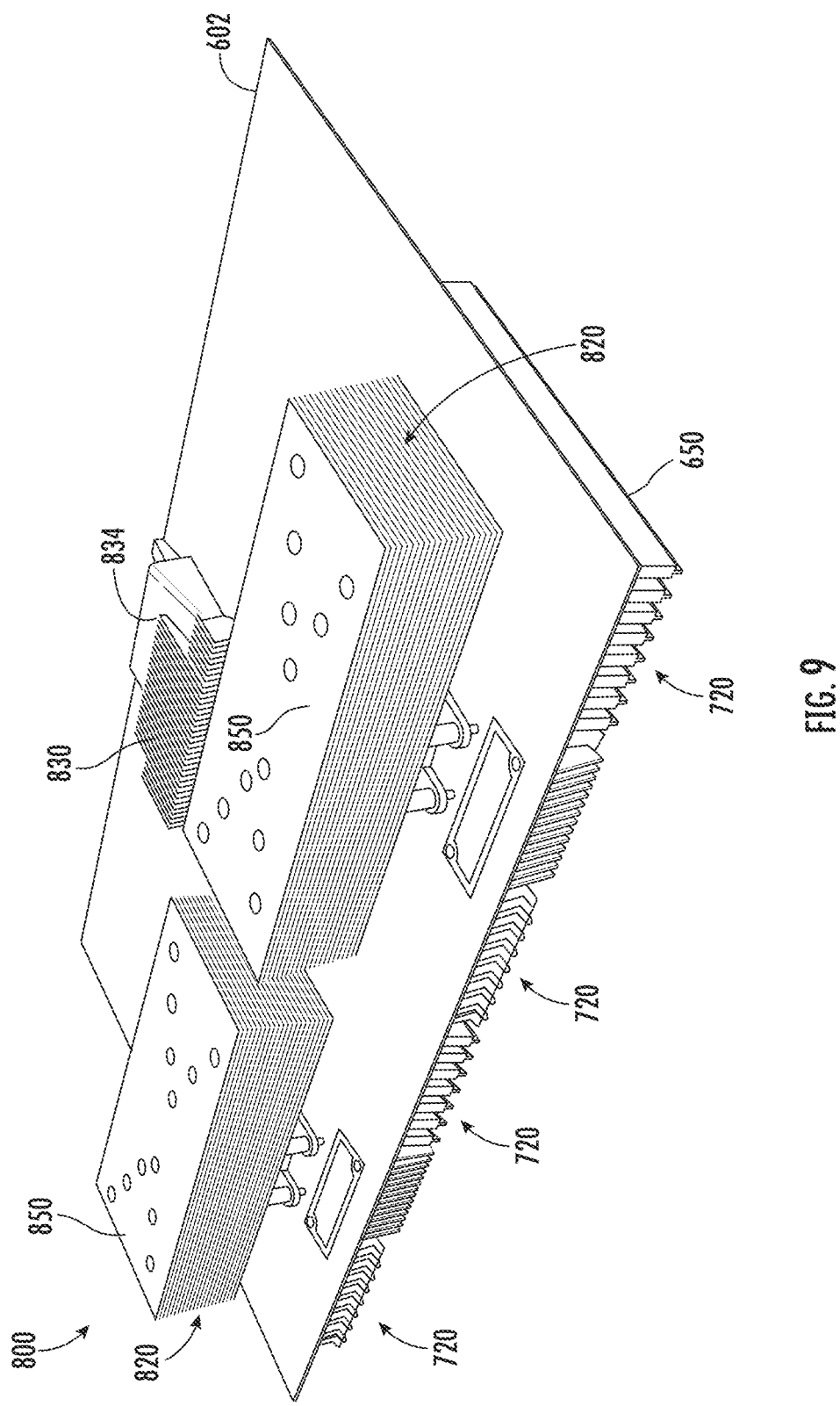
FIG. 9 is a top perspective view of at least one embodiment of a compute sled.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsink. In some embodiments, the heat sinks 850 mounted atop the processors 820 may overlap with the heat sink attached to the communication circuit 830 in the direction of the airflow path 608 due to their increased size, as illustratively suggested by FIG. 9.

Figure 10:
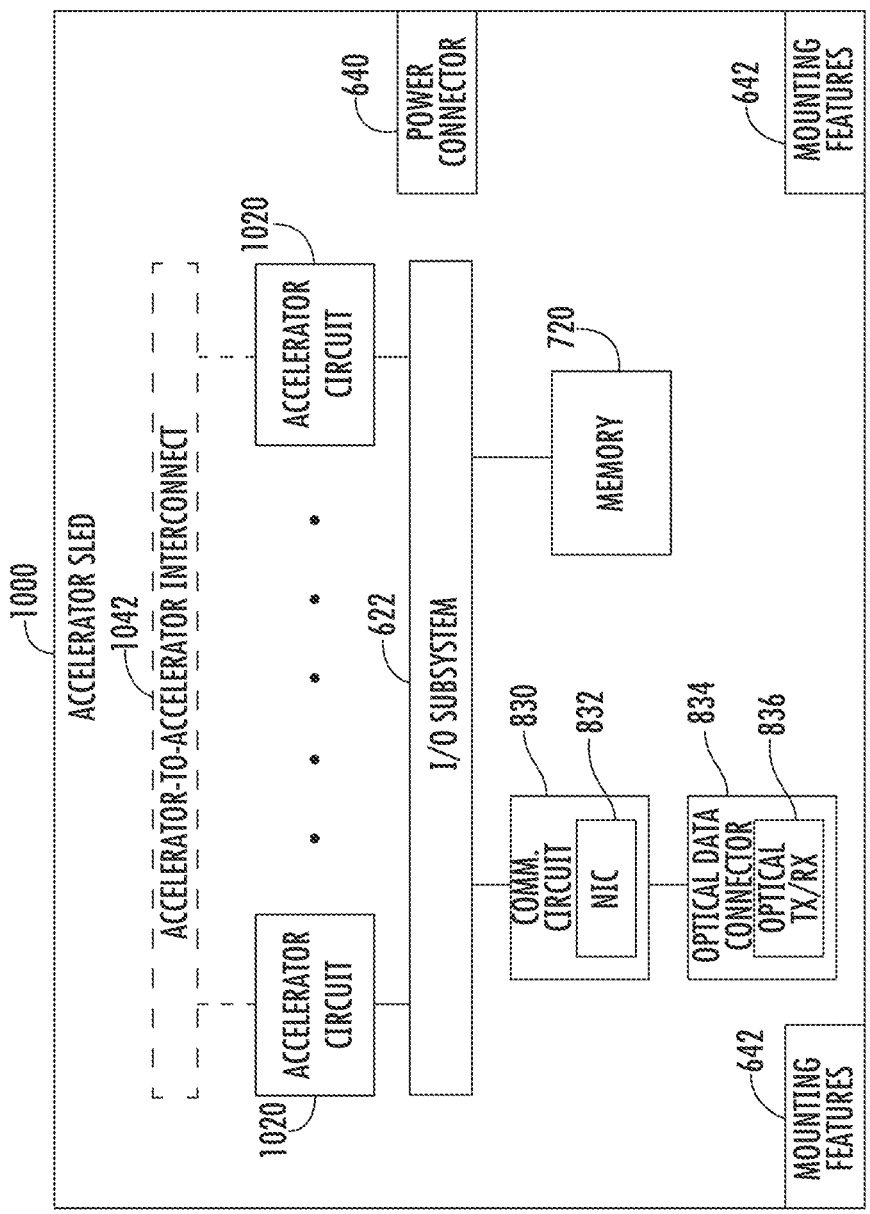
FIG. 10 is a simplified block diagram of at least one embodiment of an accelerator sled usable in a data center.

Referring now to FIG. 10, in some embodiments, the sled 400 may be embodied as an accelerator sled 1000. The accelerator sled 1000 is configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
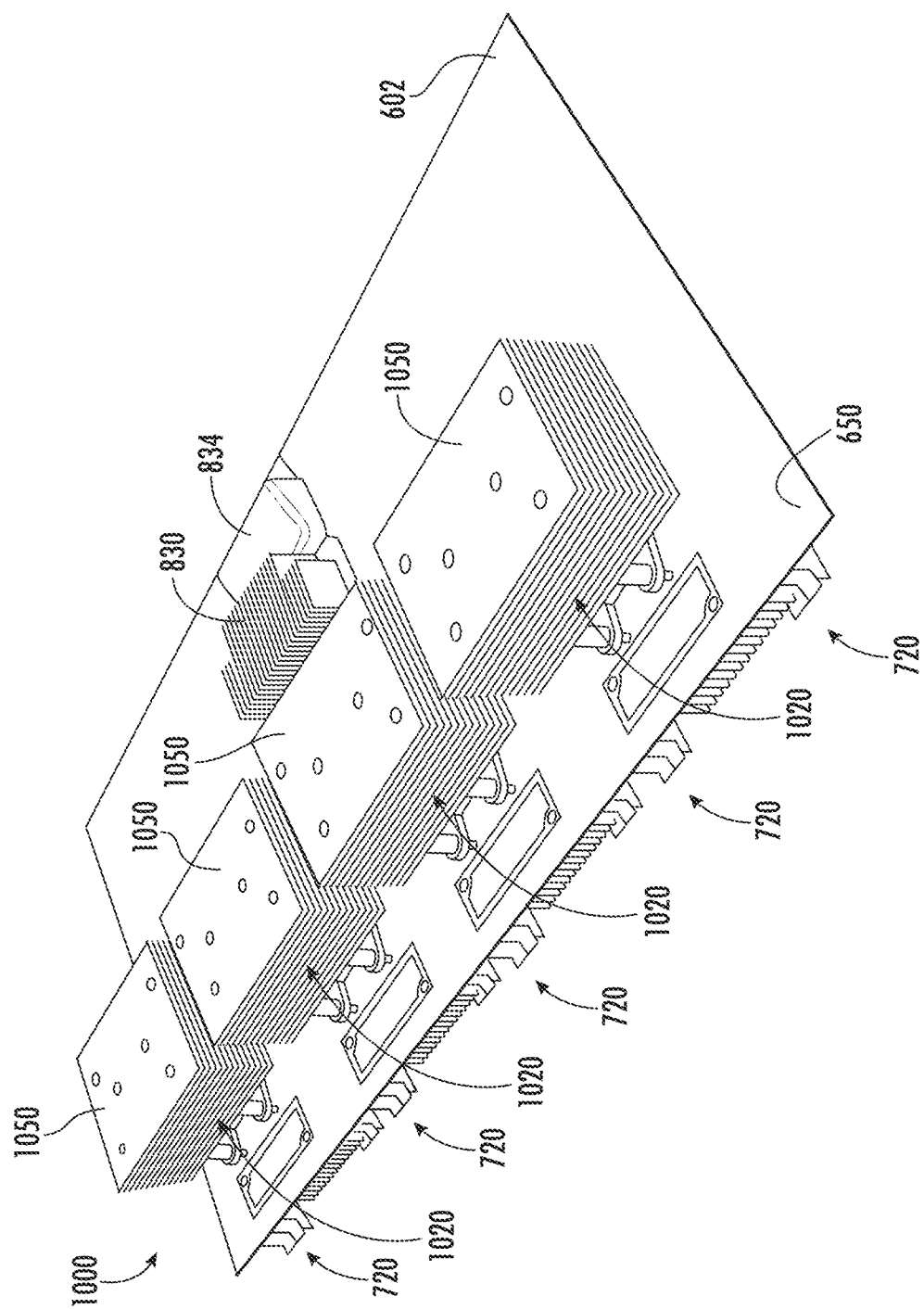
FIG. 11 is a top perspective view of at least one embodiment of an accelerator sled.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, central processing units, cores, field programmable gate arrays (FPGA), application-specific integrated circuits (ASICs), programmable control logic (PCL), security co-processors, graphics processing units (GPUs), neuromorphic processor units, quantum computers, machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than traditional heatsinks because of the "free" area provided by the memory resources 720 being located on the bottom side 750 of the chassis-less circuit board substrate 602 rather than on the top side 650.

Figure 12:
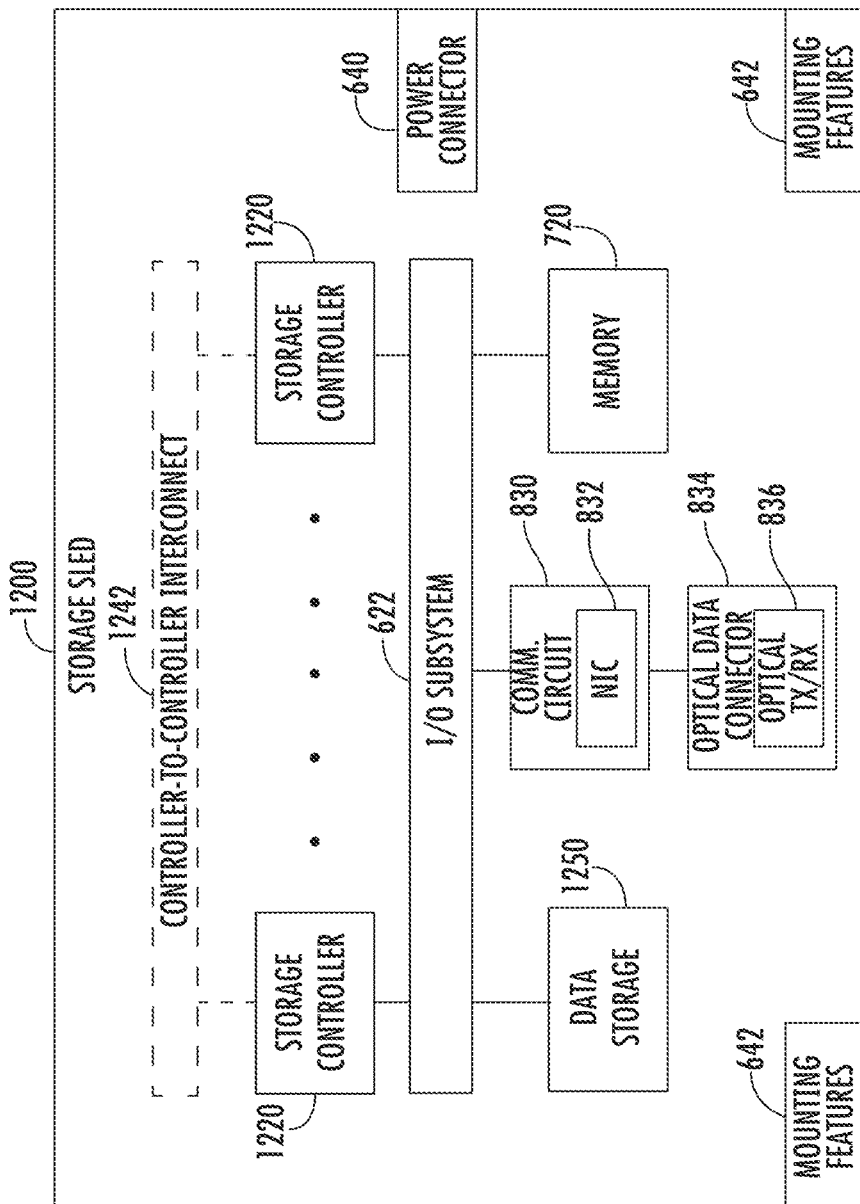
FIG. 12 is a simplified block diagram of at least one embodiment of a storage sled usable in a data center.

Referring now to FIG. 12, in some embodiments, the sled 400 may be embodied as a storage sled 1200. The storage sled 1200 is configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above with regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
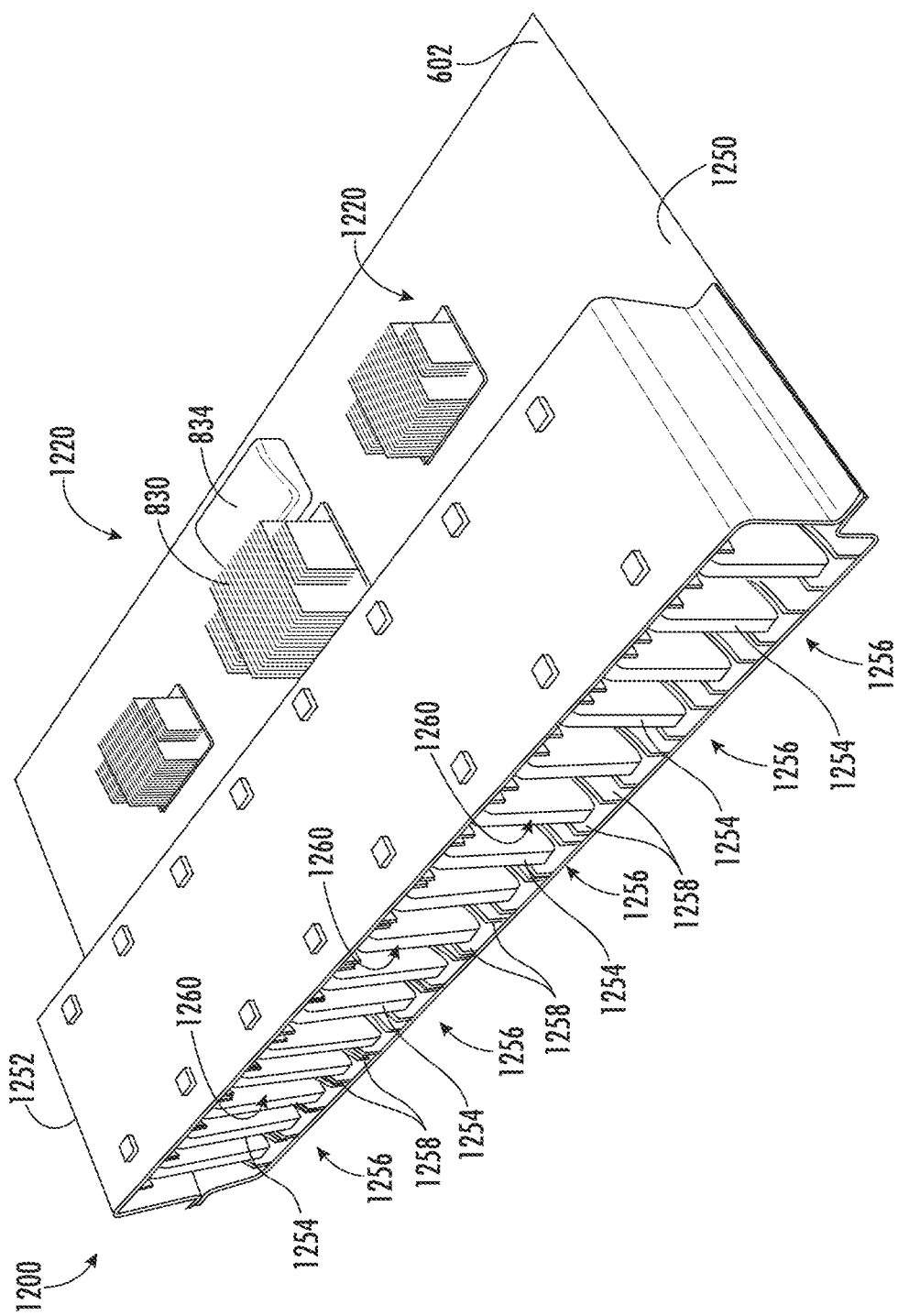
FIG. 13 is a top perspective view of at least one embodiment of a storage sled.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (e.g., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with each other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto. As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
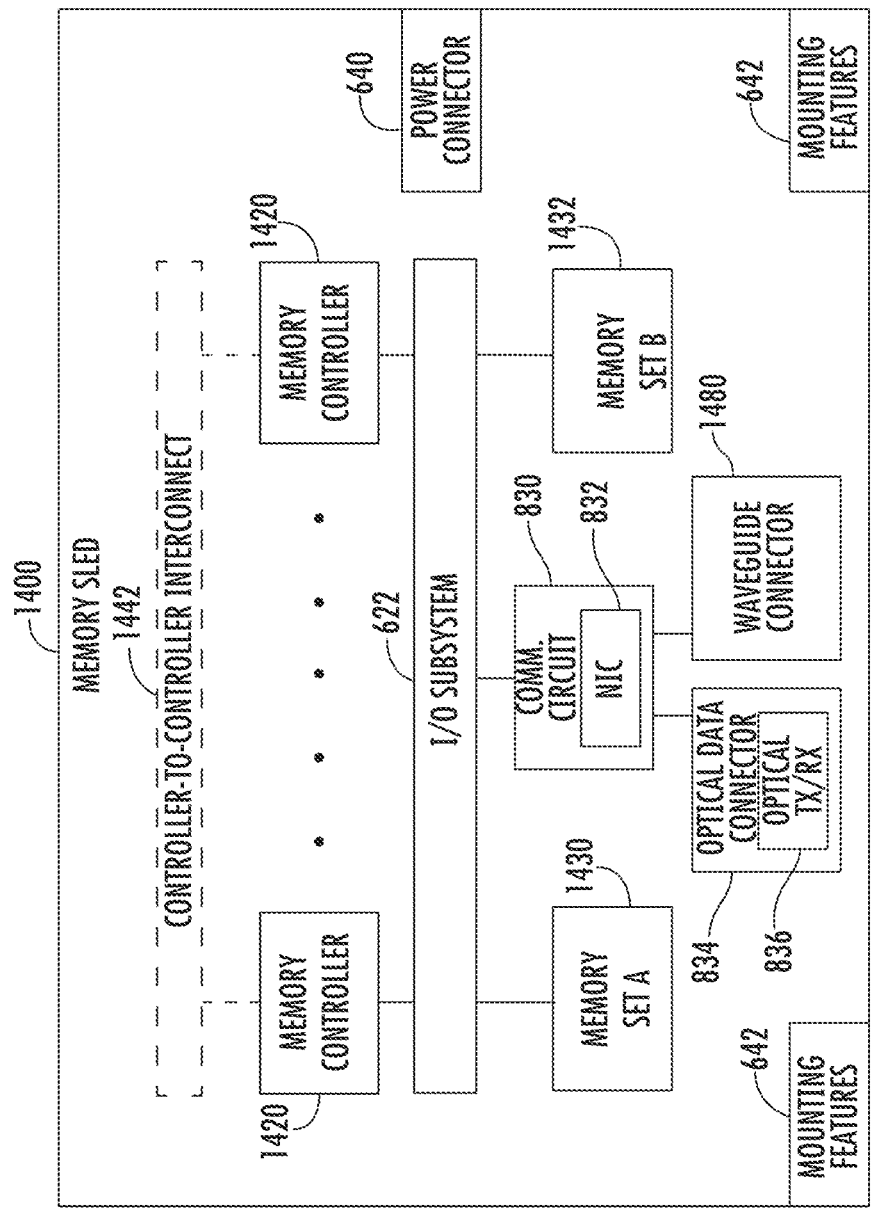
FIG. 14 is a simplified block diagram of at least one embodiment of a memory sled usable in a data center.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each memory controller 1420 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (e.g., receive) lanes and 16 Tx (e.g., transmit) lanes. Each lane, in the illustrative embodiment, is either 16 GHz or 32 GHz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
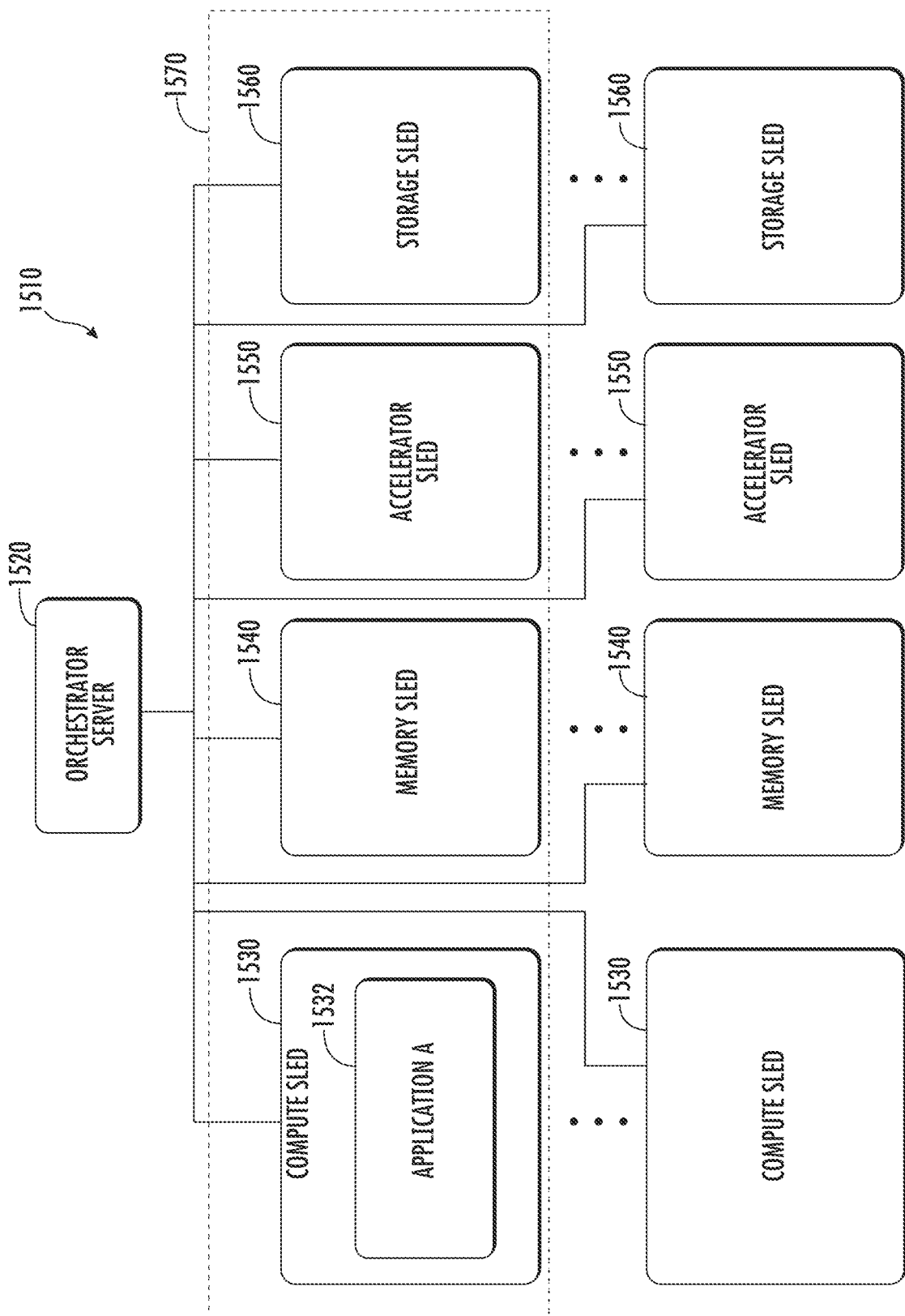
FIG. 15 depicts a system for executing one or more workloads.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a processor 820 on a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., a target throughput, a target latency, a target number instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. The orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing. Similarly, the orchestrator server 1520 may determine to dynamically deallocate physical resources from a managed node if the orchestrator server 1520 determines that deallocating the physical resource would result in QoS targets still being met.

Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100. In some embodiments, the orchestrator server 1520 may identify patterns in resource utilization phases of the workloads and use the patterns to predict future resource utilization of the workloads.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Various storage protocols exist that enable access to storage devices using a network or fabric. For example, the NVMe over Fabrics (NVMe-oF) specification is designed to enable access to remote NVMe compatible solid state drives (SSDs). For example, NVMe-oF is described at least in NVM Express Base Specification Revision 1.4 (2019), as well as predecessors, revisions or variations thereof. NVMe-oF compatible devices provide high performance NVMe storage drives to remote systems accessible over a network or fabric. Distributed block storage systems provide block device functionality to applications by presenting logical block devices that are stored in segments potentially scattered across a large pool of remote storage devices. To use these logical block devices, applications determine the location of all the segments to access.

Figure 16:
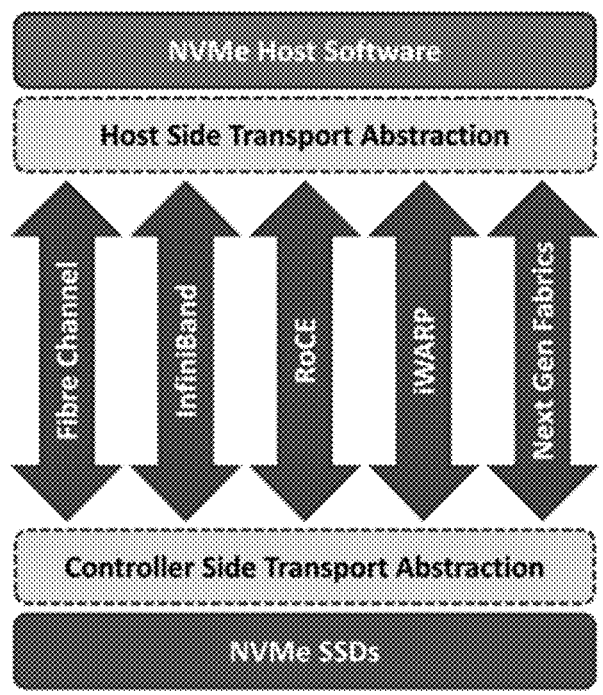
FIG. 16 shows an example of NVMe-oF commands sent through different transport layers.

FIG. 16 shows an example of NVMe-oF commands sent through different transport layers such as FibreChannel, InfiniBand, RoCE, iWARP, transmission control protocol (TCP), and so forth. Transport layers may extend to leverage User Data Protocol (UDP), quick UDP Internet Connections (QUIC), and so forth. NVMe-oF enables transmission of NVMe commands to a remote device using a network or fabric. Using RDMA with NVMe-oF leverages any of the RDMA technologies, including InfiniBand, RoCE and iWARP. As the NVMe/RDMA protocol is converted at a queue level, underlying data can be kept unchanged, e.g., the network data could be directly copied by DMA to buffers in a NVMe protocol stack by RDMA hardware (e.g., an RDMA compatible network interface card (NIC)) or vice versa.

RDMA can involve direct writes or reads to copy content of buffers across a connection without the operating system managing the copies. A network interface card or other interface to a connection can implement a direct memory access engine and create a channel from its RDMA engine though a bus to application memory. A send queue and receive queue can be used to transfer work requests and are referred to as a Queue Pair (QP). A requester (not shown) places work request instructions on its work queues that tells the interface contents of what buffers to send to or receive content from. A work request can include an identifier (e.g., pointer or memory address of a buffer). For example, a work request placed on a send queue (SQ) can include an identifier of a message or content in a buffer (e.g., app buffer) to be sent. By contrast, an identifier in a work request in a Receive Queue (RQ) can include a pointer to a buffer (e.g., app buffer) where content of an incoming message can be stored. An RQ can be used to receive an RDMA-based command or RDMA-based response. A Completion Queue (CQ) can be used to notify when the instructions placed on the work queues have been completed.

Software solutions can provide storage in a cloud system such as a QEMU emulated NVMe device and Storage Performance Development Kit (SPDK) Vhost-NVMe. However, some solutions can be low performance (e.g., high latency) because an NVMe-oF package is formed using processor-executed software. For those software solutions that access remote storage, as data is to be copied from one layer to another layer (e.g., for transmit, copy from memory allocated to a virtual device to memory allocated to a physical device and for receive, the opposite), the latency may be too high. Various embodiments can use any feature of a software solution.

Figure 17:
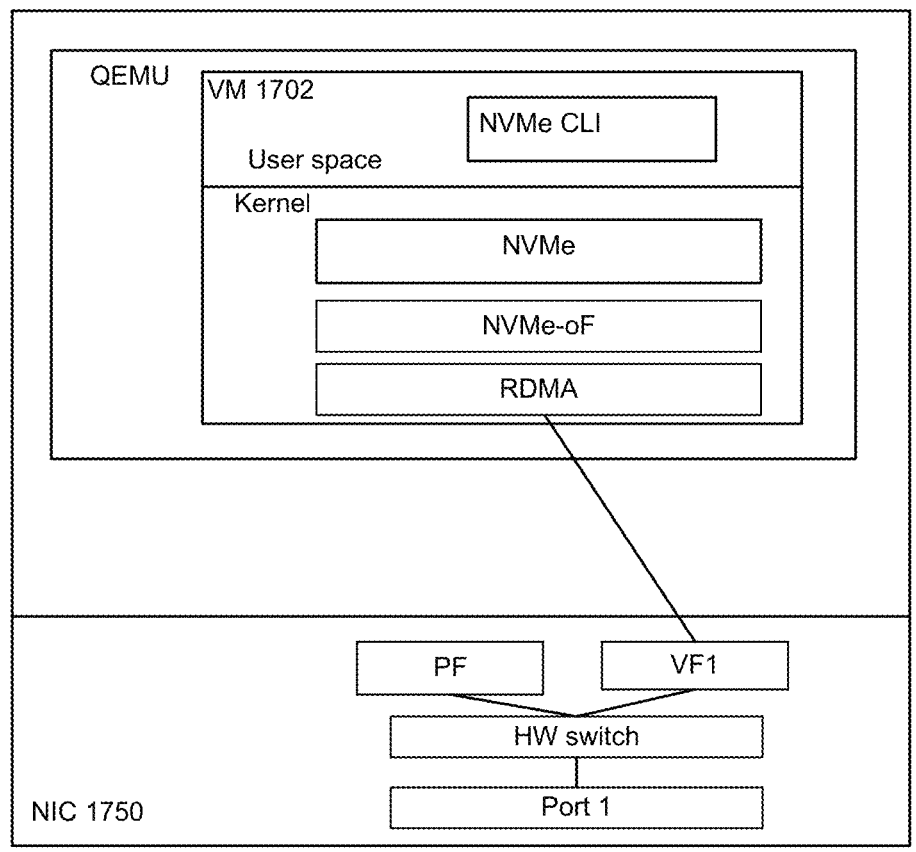
FIG. 17 depicts a pass through solution in which NVMe-oF transactions are handled inside user space.

FIG. 17 depicts a pass through solution in which NVMe-oF transactions are handled inside a user virtual machine (VM) in user space. Linux® kernel and Windows® Server allows setting up NVMe-oF connectivity within a VM 1702. In this solution, VM 1702 accesses an RDMA compatible NIC 1750 to connect to the remote NVMe-oF target through an NVMe-oF driver executed in VM 1702. However, in a pass through solution, cloud users (e.g., a tenant) provision discovery and connect to a remote storage pool. Example discovery and connect commands can be:

Discovery: nvme discover -t rdma -a 11.11.11.100 //-a followed by storage pool address (e.g., storage pool address may be different for each underlayer fabric and for NVMe over RDMA, storage pool address can be an IP address).

Connect: nvme connect -t rdma -a 10.10.10.100 -n nqn. com.example:5700.54be //-n followed by storage pool internal NVMe Qualified Name.

However, a user provisioning discovery and connecting remote resources can introduce errors in provisioning, a burden on the user, and a security risk. For example, a user may not understand a storage pool internal NVMe Qualified Name and can misspell the name and a connection might not be established. A security risk can arise from exposing a storage pool address, which can open up that storage pool address and potentially surrounding addresses to unauthorized attempts to access content. Various embodiments can use any feature of the pass through solution.

Figure 18:
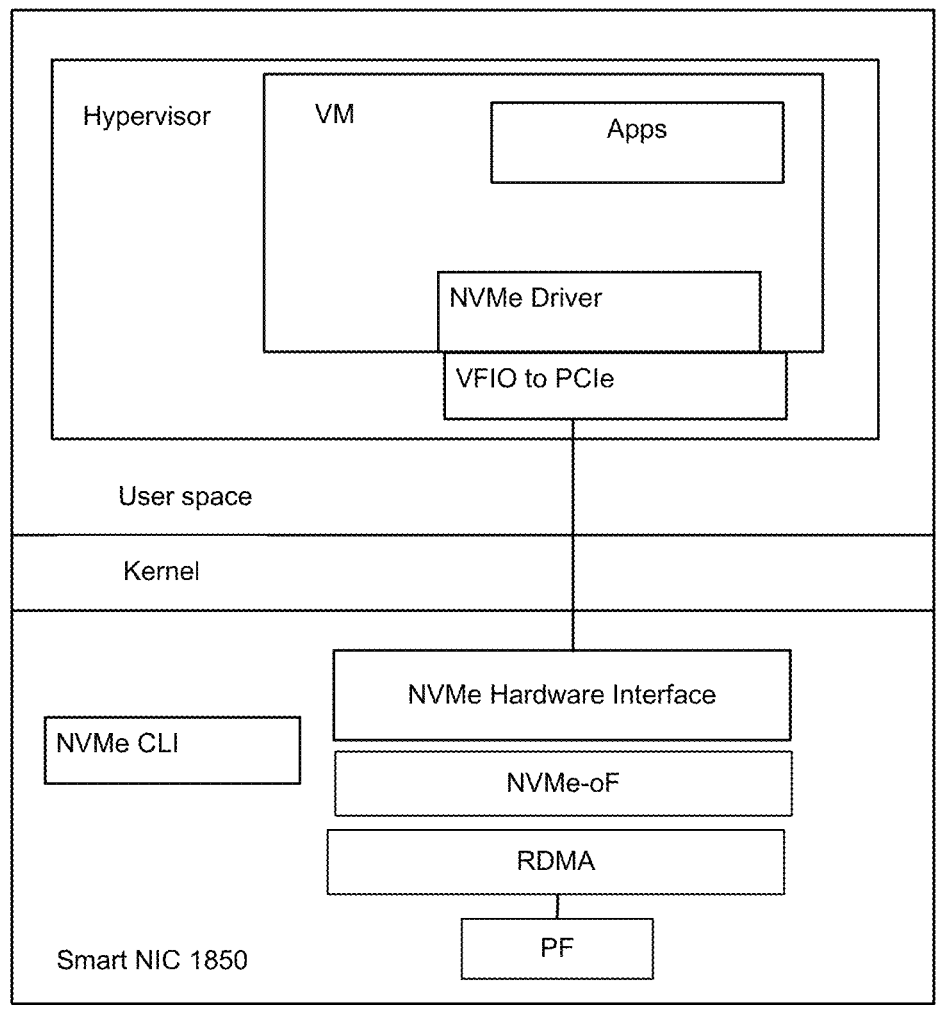
FIG. 18 depicts an example smart network interface with an NVMe hardware interface.

FIG. 18 depicts an example smart NIC with an NVMe hardware interface. Smart NIC 1850 performs NVMe connection set up and configuration. However, smart NIC 1850 can be considerably more expensive than a NIC or RDMA compatible NIC. Various embodiments can use any feature of the smart NIC.

Various embodiments can permit cloud service providers (CSP) to leverage NVMe-oF as storage infrastructure and permit cloud users to not need to manually configure use of an NVMe-oF storage device or understand an underlying fabric but can use remote storage as a local NVMe PCIe connected storage. Various embodiments provide use of an intermediary to copy NVMe commands intended for an NVMe device to a send queue associated with an RDMA compatible NIC. The RDMA compatible NIC can transmit the NVMe commands to a target entity, including a locally attached NVMe storage device or remote NVMe-oF target device over a fabric or network. For commands received from a remote storage device, the RDMA compatible NIC can provide the received commands for access by the intermediary to copy to a queue accessible to a virtual machine (VM) or application.

Figure 19A:
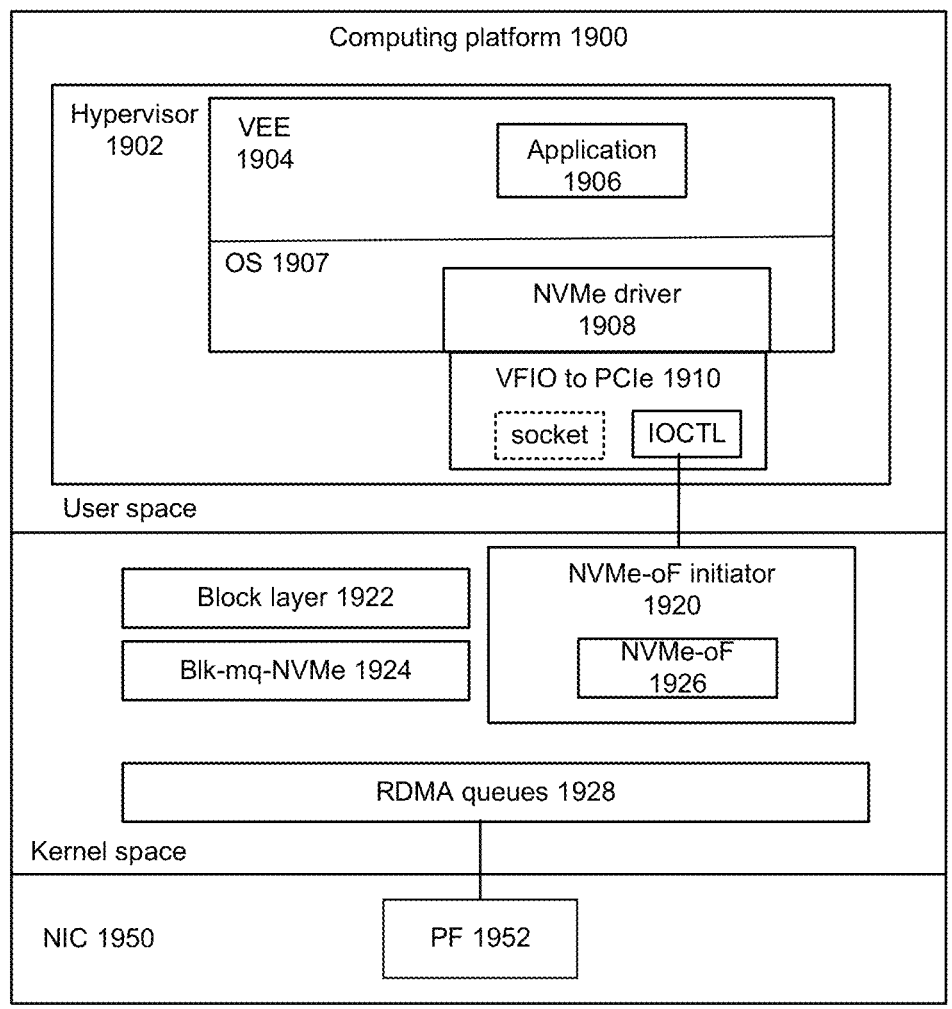
FIGS. 19A and 19B depict example systems.

FIG. 19A depicts an example system. Computing platform 1900 (e.g., server, blade, rack, or host) can use one or more processors, memory, and other circuitry and devices described herein. Computing platform 1900 can utilize network interface card (NIC) 1950 to communicate with a remote target device at least in connection with NVMe-oF transactions. NIC 1950 can support communications with Ethernet and remote direct memory access (RDMA) or other remote direct memory access protocols. In some examples, remote direct memory access semantics can use queue pairs (QP) associated with remote direct memory access (RDMA) as described at least in iWARP, InfiniB and, Omni-Path, RDMA over converged Ethernet (RoCE) and RoCE v2. Virtualized execution environment (VEE) 1904 or application 1906 can use RDMA Verbs (e.g., RDMA Protocol Verbs Specification (Version 1.0) or other versions or variations thereof) to configure memory regions for use with RDMA.

VEE 1904 can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an OS or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux® and Windows® Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings.

In some examples, platform 1900 and NIC 1950 can support single-root I/O virtualization (SR-IOV). PCI-SIG Single Root IO Virtualization and Sharing Specification v1.1 and predecessor and successor versions describe use of a single PCIe physical device under a single root port to appear as multiple separate physical devices to a hypervisor or guest operating system. SR-IOV uses physical functions (PFs) and virtual functions (VFs) to manage global functions for the SR-IOV devices. PFs can be PCIe functions that are capable of configuring and managing the SR-IOV functionality. For example, a PF can configure or control a PCIe device, and the PF has ability to move data in and out of the PCIe device. For example, for a network adapter, the PF is a PCIe function of the network adapter that supports SR-IOV. The PF includes capability to configure and manage SR-IOV functionality of the network adapter, such as enabling virtualization and managing PCIe VFs. A VF is associated with a PCIe PF on the network adapter, and the VF represents a virtualized instance of the network adapter. A VF can have its own PCIe configuration space but can share one or more physical resources on the network adapter, such as an external network port, with the PF and other PFs or other VFs.

In some examples, platform 1900 and NIC 1950 can interact using Multi-Root IOV (MR-IOV). Multiple Root I/O Virtualization (MR-IOV) and Sharing Specification, revision 1.0, May 12, 2008, from the PCI Special Interest Group (SIG), is a specification for sharing PCI Express (PCIe) devices among multiple computers.

In some examples, platform 1900 and NIC 1950 can support Intel® Scalable I/O Virtualization (SIOV) can be used by the system. For example, platform 1900 can access NIC 1950 as a SIOV capable device. A SIOV capable device can be configured to group its resources into multiple isolated Assignable Device Interfaces (ADIs). Direct Memory Access (DMA) transfers from/to each ADI are tagged with a unique Process Address Space identifier (PASID) number. Unlike the coarse-grained device partitioning approach of SR-IOV to create multiple VFs on a PF, SIOV enables software to flexibly compose virtual devices utilizing the hardware-assists for device sharing at finer granularity. Performance critical operations on the composed virtual device can be mapped directly to the underlying device hardware, while non-critical operations are emulated through device-specific composition software in the host. A technical specification for SIOV is Intel® Scalable I/O Virtualization Technical Specification, revision 1.0, June 2018.

In accordance with various embodiments, an example operation of platform 1900 with NIC 1950 is described next. Hypervisor 1902 can emulate a processor through binary translation and provide different hardware and device models for the machine to run a variety of guest operating systems. Examples of hypervisor 1902 include but are not limited to Quick EMUlator (QEMU), Xen, Microsoft Hyper-V, Linux KVM, Oracle VM VirtualBox, bhyve, or any virtual machine monitor. Hypervisor 1902 can be used in bare metal (e.g., single tenant) or hosted (e.g., multiple tenants) environments. In some examples, hypervisor 1902 can be provisioned by an administrator to setup a specify storage pool address and storage pool internal NVMe Qualified Name. An administrator can use NVMe-oF commands to setup a remote storage connection for VEE 1904.

In some examples, VEE 1904 or application 1906 can issue a storage or memory access request (e.g., NVMe admin or I/O command) via NVMe driver 1908. NVMe driver 1908 can issue an NVMe command via virtual function I/O (VFIO) to PCIe interface 1910 of the kernel layer to NIC 1950. In some examples, VFIO is a Linux framework to present PCIe devices to a hypervisor, although other frameworks can be used. VFIO can include two interfaces: the input/output control (IOCTL) system call for a kernel solution, and a socket interface for a userspace solution.

However, according to various embodiments, instead of NIC 1950 receiving the commands, NVMe-oF initiator 1920, as an intermediary, receives commands and associated storage addresses from driver 1908. NVMe-oF initiator 1920 can intercept a command at least in a following manner. When VEE 1904 or application 1906 finishes adding one or more entries to a Submission Queue, it can trigger a Doorbell Register of that queue and this Doorbell Register can trigger NVMe-oF initiator 1920 to intercept these one or more Submission Entries. For example, queues are allocated for VEE 1904 and memory addresses can be passed to NVMe-oF initiator 1920 by an Admin Submission Queue (ASQ) and Admin Completion Queue (ACQ) registers defined in NVMe base specification chapter 3.1.9 and 3.1.10. In other words, in some examples, NVMe driver 1908 communicates with NVMe-oF initiator 1920 as though NVMe-oF initiator 1920 is NIC 1950.

NVMe-oF initiator 1920 can create virtual storage devices for VEE 1904 or for an operating system 1907 executing on platform 1900. Any type of operating system can be executed by platform 1900 or within a VEE such as but not limited to Linux, Windows Server, FreeBSD, or VMware (e.g., ESXI). On behalf of VEE 1904 (and irrespective of guest operating system executed in VEE 1904), NVMe-oF initiator 1920 can receive NVMe commands (e.g., admin, read, or write) from NVMe driver 1908 and act as an intermediary between NVMe driver 1908 and an RDMA-enable NIC 1950 by copying a new NVMe Submission Queue Entry (e.g., defined in NVM Express™ Base Specification chapter 4.2) or by directly referencing contents pointed to by the NVMe Submission entry identified by driver 1908 to an RDMA Send Queue (SQ) and triggering an RDMA doorbell.

RDMA-enabled NIC 1950 can transmit the NVMe command to the target device via a network or fabric using a packet in accordance with any available protocol (e.g., Ethernet). For responses, NVMe-oF initiator 1920 can copy an RDMA response from an RDMA Receive Queue (RQ) to an NVMe Completion Queue for access by VEE 1904, or the NVMe response contained in an RDMA response from an RDMA Receive Queue (RQ) can be directly referenced by the NVMe Completion Queue for access by VEE 1904. For example, RDMA queues 1928 can include one or more RDMA SQs.

In some examples NVMe-oF stack 1926 can transfer a new NVMe Submission Queue Entry to an RDMA Send Queue (SQ) or RDMA response from an RDMA CQ to an NVMe Completion Queue for access by VEE 1904. For example, RDMA queues 1928 can include one or more RDMA CQs.

In some examples, translation of NVMe commands to NVMe-oF can be performed by NVMe-oF initiator 1920 in kernel space not by NIC 1950 so that a NIC that performs offloaded NVMe-oF transaction generation or processing is not used, however it can be. Kernel space can be a memory area reserved for use by a privileged operating system kernel, kernel extensions, and some device drivers. Performing translation in kernel space can be beneficial because of security concerns as storage addresses are not exposed to a user by maintained in kernel space. Moreover, issues with a tenant mistyping or providing erroneous storage pool internal NVMe Qualified Name or storage addresses can be avoided as an administrator enters the information. By contrast, user space or userspace can be a memory area where application software and some drivers execute and write or read content. User space can be a protected region of memory by a CPU using virtual function I/O (VFIO).

Block layer 1922 can be an operating system block storage layer. Block layer 1922 can provide one or more of: (1) a pluggable module application program interface (API) for implementing block devices that interface with different types of block storage devices; (2) driver modules for NVMe, malloc (ramdisk), Linux AIO, virtio-scsi, Ceph RBD, Pmem and Vhost-SCSI Initiator and more; (3) an application API for enumerating and claiming block devices and then performing operations (read, write, unmap, etc.) on those devices; (4) facilities to stack block devices to create complex I/O pipelines, including logical volume management (lvol) and partition support (GPT); (5) request queuing, timeout, and reset handling; or (6) multiple, lockless queues for sending I/O to block devices.

Block multiple queue NVMe (blk-mq-NVMe) 1924 can create virtual storage devices for platform 1900 operating as a physical server used, for example, by a cloud administrator. blk-mq-NVMe 1924 can use an NVMe-oF API to access NVMe-oF stack 1926. blk-mq-NVMe 1924 can provide a Linux Kernel internal API interface between block layer 1922 and a virtual storage device which is created after connection was established to remote NVMe-oF storages (e.g., block device).

RDMA queues 1928 can represent RDMA Send Queues, Completion Queues, or Response Queues.

NIC 1950 can be RDMA enabled and accessible as a physical function (PF) 1952 by VEE 1904 based on SR-IOV, MR-IOV, or SIOV. RDMA communications can rely on protocols that include at least one or more of: InfiniB and, iWARP, RoCE and RoCE v2. NIC 1950, in some examples, can include a smart NIC with can perform offloaded processing tasks that a system CPU could perform using a processor. For example, tasks can include one or more of: encryption, decryption, firewall, TCP/IP offload, or HTTP processing.

In some examples, configuration of platform 1900 with NIC 1950 with ability to access or communicate with an NVMe-oF target can be as follows. A cloud administrator can issue NVMe-oF commands to be sent to platform 1900 to setup a remote storage connection for VEE 1904. To setup the connection, the cloud administrator can specify at least one storage pool address and storage pool internal NVMe Qualified Name in a similar manner as those described with respect to Discovery and Connect commands, described earlier. The cloud administrator can use a remote storage connection to create an instance of NVMe-oF initiator 1920 (e.g., virtual device) in kernel space by accessing kernel space mdev framework running on platform 1900. The framework can make calls to any library, functions, objects, or modules to create NVMe-oF initiator 1920. Hypervisor 1902 can associate the created NVMe-oF initiator 1920 to VEE 1904. VEE 1904 can communicate with NVMe-oF initiator 1920 via driver 1908 to issue an NVMe command to read data from a storage medium, write data to a storage medium, an administration command, or any NVMe command.

Figure 19B:
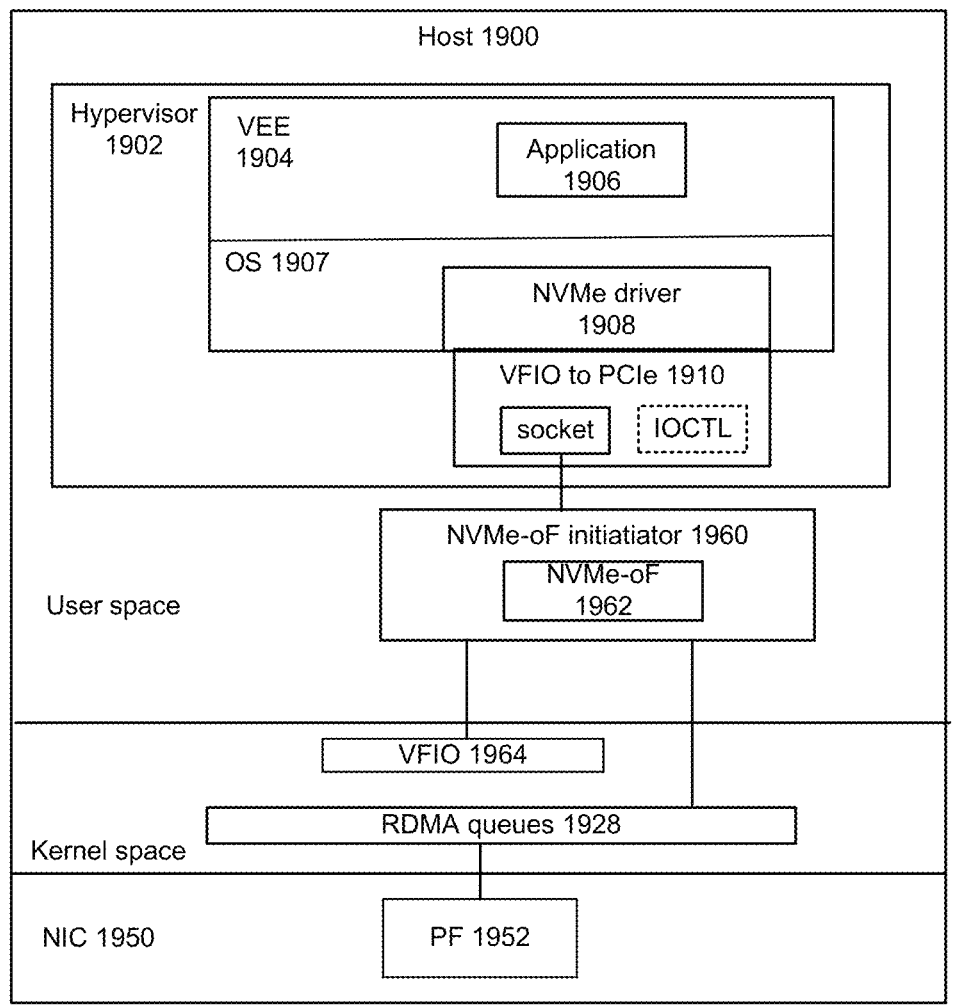

FIG. 19B depicts an example user space implementation. For a user space implementation, e.g., NVMe-oF in SPDK, a module in kernel space and a user space library solution in host OS 1907 can be used. In some examples, NVMe-oF stack 1962 can transfer a new NVMe Submission Queue Entry to an RDMA Send Queue (SQ) or RDMA response from an RDMA CQ to an NVMe Completion Queue for access by VEE 1904.

NVMe-oF initiator 1960 can access NVMe commands stored within a user space protected memory region (e.g., Virtualization Technology for Direct I/O (VT-d) or AMD-Vi). AMD-Vi or VT-d can be a processor feature that enables virtualization of I/O resources (directed 110). In some examples, NVMe-oF initiator 1960 can run within a VFIO container. In some examples, NVMe-oF initiator 1960 can perform the same operations as that of NVMe-oF initiator 1920. NVMe-oF initiator 1960 can be set up similarly to NVMe-oF initiator 1920 by a cloud administrator using an mdev framework. NVMe-oF initiator 1960 and user space NVMe-oF initiator 1962 can negotiate with one or more remote NVMe-oF targets through kernel modules (e.g., RDMA queues 1928 and PF 1952) to for the NVMe-oF target to provide storage for VEE 1904 or application 1906.

VFIO 1964 in kernel space can manage memory boundaries to limit memory access by NVMe-oF initiator 1960 and provide virtual-to-physical memory translation in connection with accessing NVMe commands or RDMA queues.

Figure 20A:
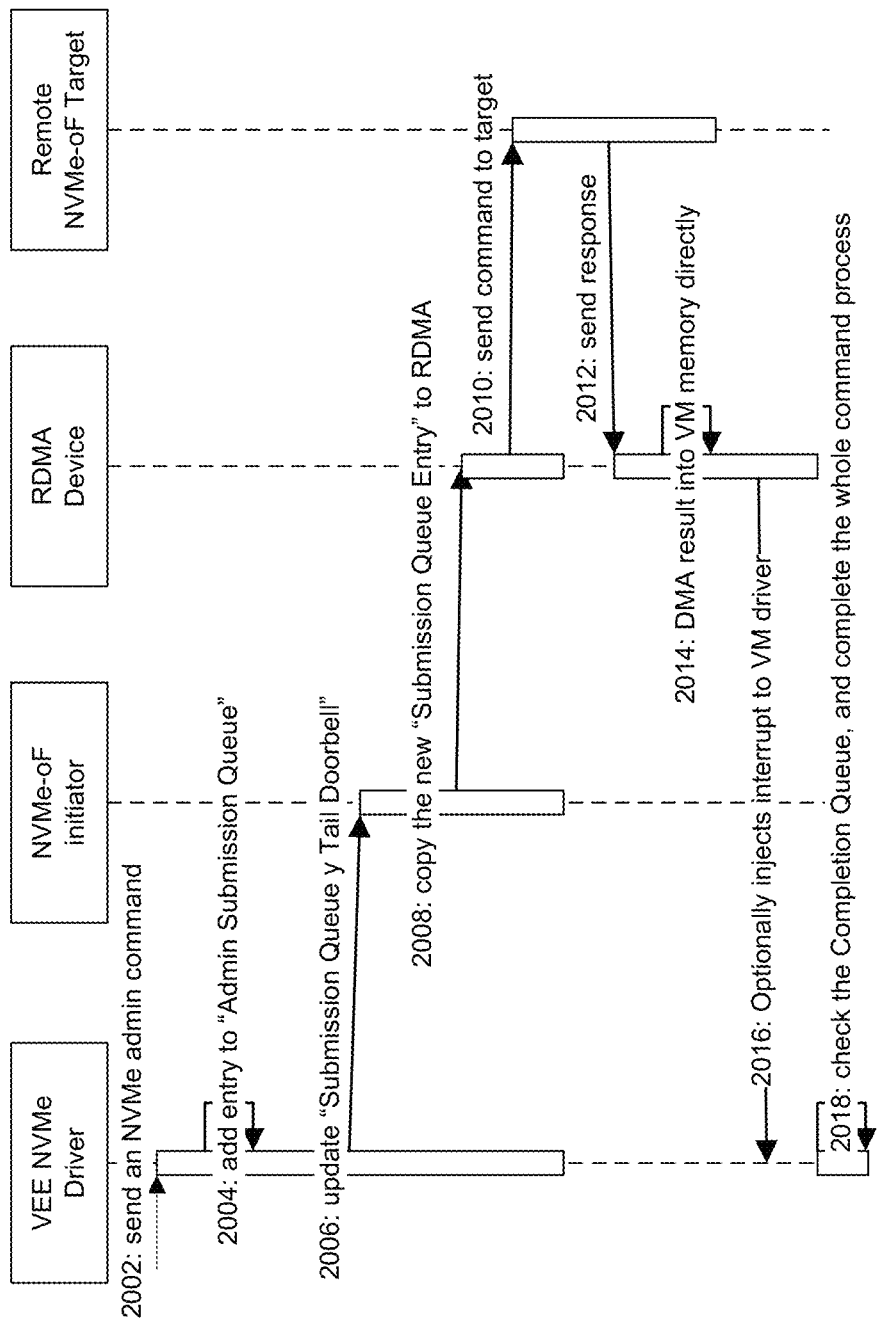
FIGS. 20A and 20B depict example sequences.

FIG. 20A depicts an example sequence using an NVMe-oF initiator for transmission of an admin command. For example, at 2002, a VEE can interact with a NVMe driver to cause transmission of an NVMe admin command. At 2004, VEE NVMe driver adds one entry to an Admin Submission Queue for the NVMe admin command. At 2006, NVMe driver updates "Submission Queue y Tail Doorbell" defined in NVMe Base Specification chapter 3.1.24, which triggers a VMExit to NVMe-oF initiator.

At 2008, NVMe-oF initiator copies the new Admin Submission Queue Entry (e.g., defined in NVMe Base Specification chapter 4.2) or a pointer to the entry to an RDMA Send Queue and triggers an RDMA doorbell. If this entry contains Physical Region Page (PRP) list which is not supported in NVMe-oF, the PRP list is to be converted to a Scatter Gather List (SGL). If this command includes information, e.g., IO Queue address, the address can be stored for later usage.

At 2010, the RDMA Device (e.g., RDMA enabled network interface) can send the command using an RDMA protocol to a remote NVMe-oF target via a fabric, network or other wired or wireless. The remote NVMe-oF target receives this command and processes it. At 2012, the NVMe-oF target sends a response to the RDMA Device and the RDMA Device receives the responses from the NVMe-oF target. In some examples, in response to receipt of a send response at 2012, NVMe-oF initiator can copy the result from the RDMA Device to the NVMe Completion Queue. At 2014, the RDMA Device can copy the response via direct memory access (DMA) directly to the response buffers in Completion Queue accessible to the VEE NVMe driver. Optionally, 2016 can occur whereby an interrupt can be generated by the RDMA Device to the VEE NVMe driver to inform the VEE NVMe driver of a received response from the remote NVMe-oF target. At 2018, NVMe driver monitors the NVMe Completion Queue, and the VEE processes the response in the Completion Queue.

Figure 20B:
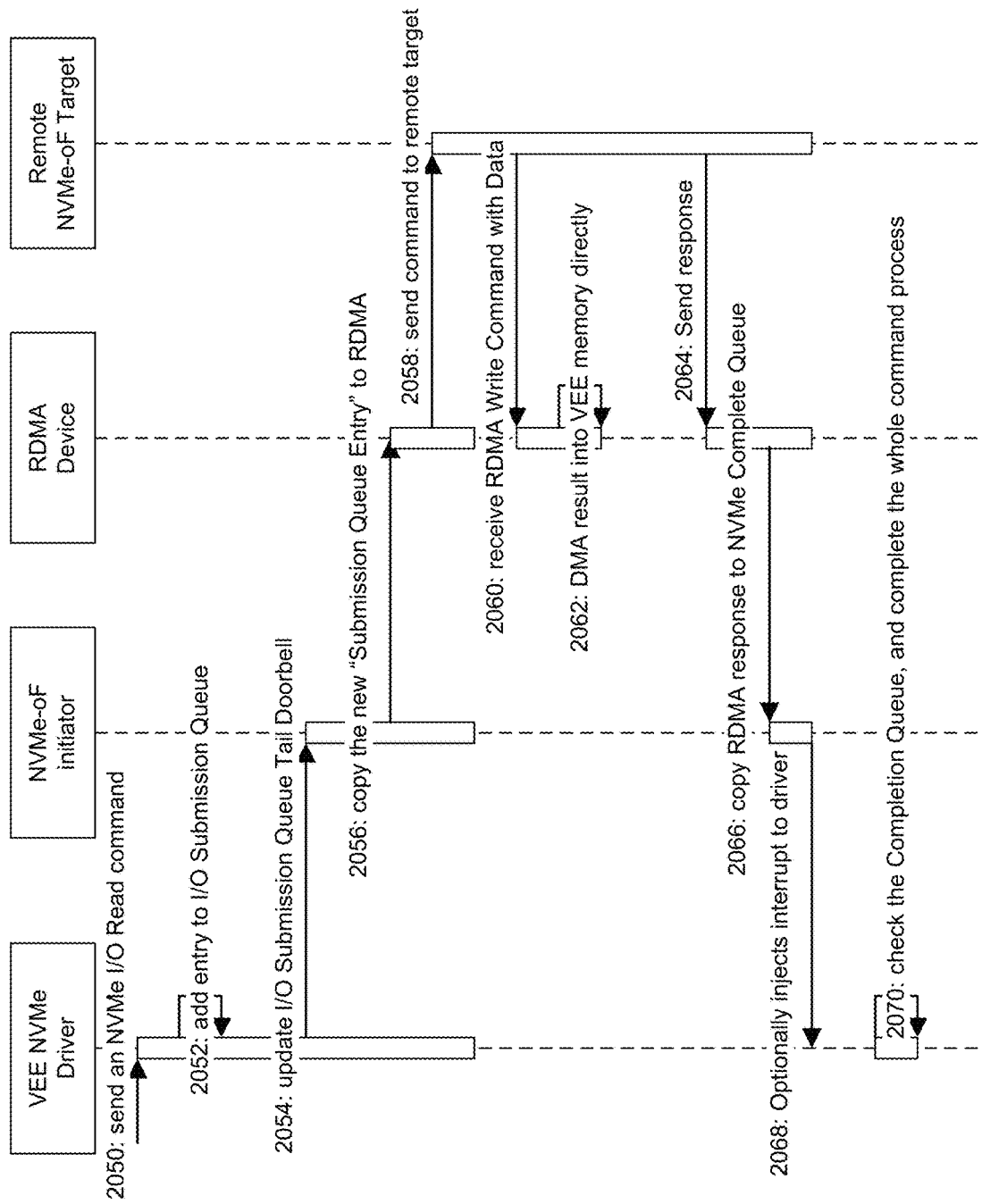

FIG. 20B depicts an example process that can use a kernel or userspace software to transfer an NVMe read command from an NVMe submission queue to an RDMA-enabled network interface and receive an NVMe write command response. At 2050, a VEE can interact with a NVMe driver to cause transmission of an NVMe I/O read command. At 2052, a VEE NVMe driver adds an entry for the NVMe I/O read command to an I/O Submission Queue. At 2054, the NVMe driver updates "I/O Submission Queue y Tail Doorbell" defined in NVMe Base Specification chapter 3.1.24, which triggers an VMExit to NVMe-oF initiator.

At 2056, the NVMe-oF initiator copies the new I/O Submission Queue Entry (e.g., defined in Base Specification chapter 4.2) to an RDMA Send Queue and triggers an RDMA doorbell. If this entry contains Physical Region Page (PRP) list which is not supported in NVMe-oF, the PRP list can be converted to a Scatter Gather List (SGL). If this Command includes information, e.g., IO Queue address, the address can be stored for later usage.

At 2058, the RDMA Device (e.g., RDMA enabled network interface) sends the I/O read command using RDMA to a remote NVMe-oF target via a fabric, network or other wired or wireless medium. The remote NVMe-oF target receives this command and processes it. For a valid read operation, at 2060, the NVMe-oF target sends a response to the RDMA Device and the RDMA Device receives the RDMA Write command with data from the NVMe-oF target. At 2062, the RDMA Device can copy data associated with the RDMA Write using DMA directly to memory accessible to the VEE.

At 2064, the remote NVMe-oF target can send a response to the RDMA Device to indicate all data was written via an RDMA Write command. At 2066, the RDMA Device copies the response to a NVMe Completion Queue. In some examples, the NVMe-oF initiator can copy the result from the RDMA Device to the NVMe Completion Queue. Optionally, 2068 can occur whereby an interrupt can be generated by the RDMA Device to the VEE NVMe driver to inform the VEE NVMe driver of a received response from the remote NVMe-oF target. At 2070, VEE NVMe driver checks the NVMe Completion Queue, and the VEE processes the response in the Completion Queue.

Figure 21:
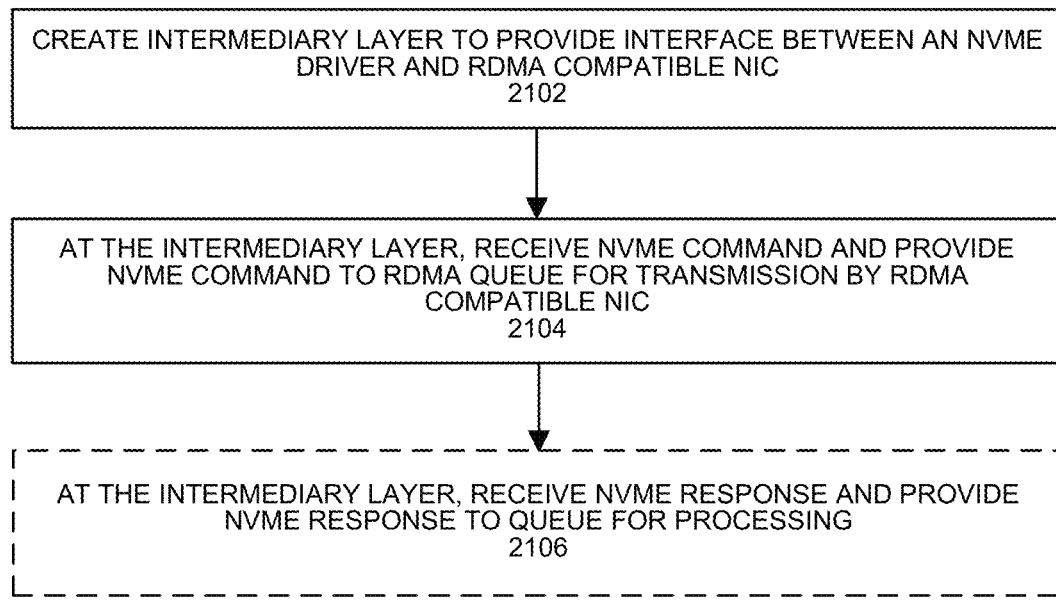
FIG. 21 depicts an example process.

FIG. 21 depicts an example process. The process can be performed by system that uses a kernel space or userspace intermediary or initiator that provides an interface between an NVMe driver and an RDMA compatible NIC. At 2102, an intermediary layer (e.g., initiator such as but not limited to an NVMe-oF initiator virtual device) can be created in kernel space or userspace by using an mdev framework running on a host. The intermediary layer can manage NVMe transactions at least to be sent to a target using a created NVMe-oF connection with the target. The intermediary layer can provide an interface between an NVMe driver and an RDMA compatible network interface.

At 2104, the intermediary layer can receive an NVMe command and provide the NVMe command to an RDMA queue for transmission. For example, an NVMe driver for a VEE can write the NVMe command in a queue and the intermediary layer can access the NVMe command from the queue and copy the NVMe command to an RDMA queue for transmission.

At 2106, optionally, an NVMe response can be transferred by the intermediary layer. For example, an RDMA response can be provided in an RDMA completion queue. The intermediary layer can copy the RDMA response to a queue accessible to a VEE such as a VEE that issued the NVMe command in 2104.

Figure 22:
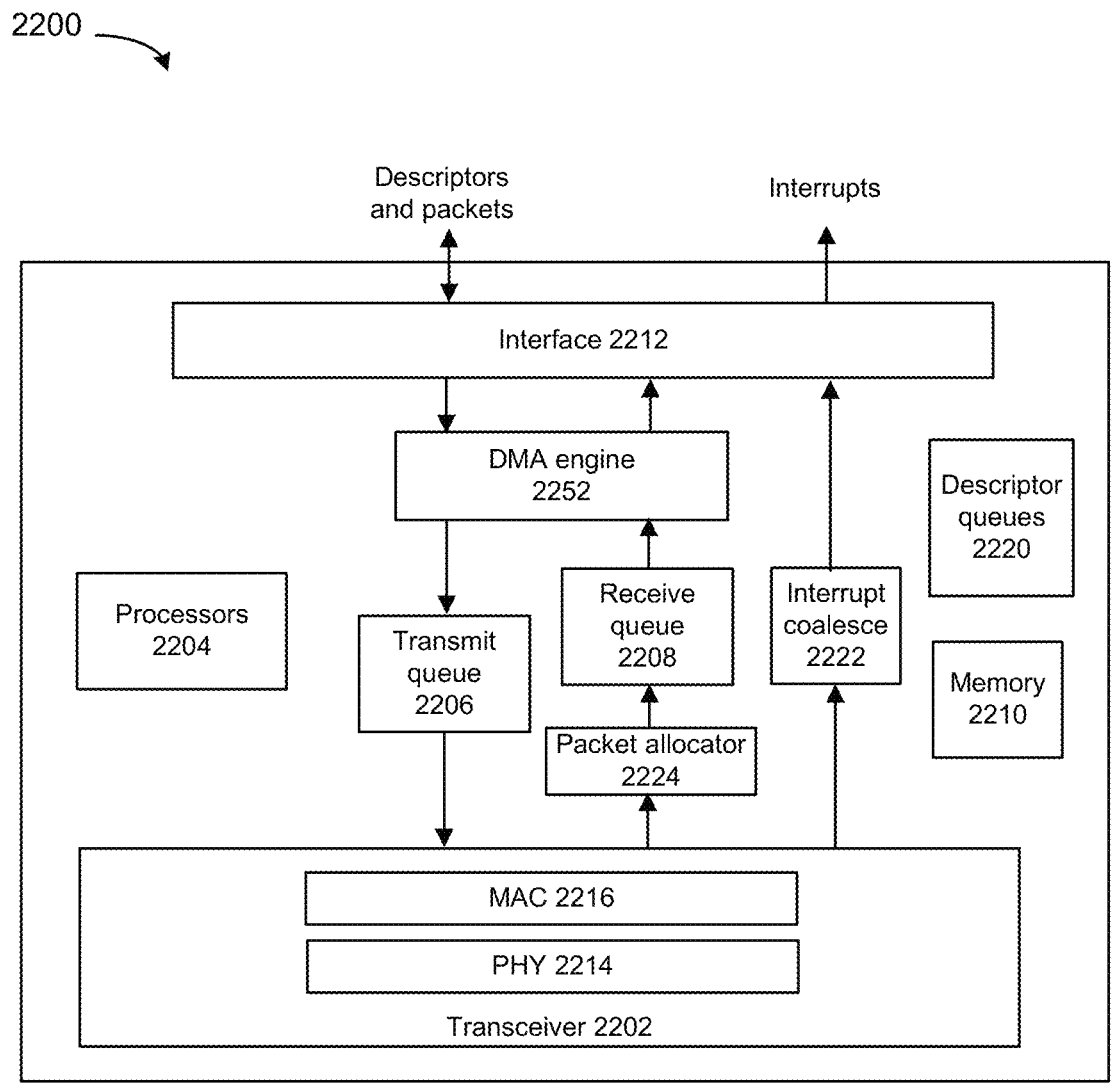
FIG. 22 depicts a network interface.

FIG. 22 depicts a network interface that can use embodiments or be used by embodiments. In some embodiments, network interface an include RDMA capability to transfer and receive NVMe commands as NVMe-oF commands. In some examples, network interface 2200 can be implemented as a network interface controller, network interface card, a host fabric interface (HFI), or host bus adapter (HBA), and such examples can be interchangeable. Network interface 2200 can be coupled to one or more servers using a bus, PCIe, CXL, or DDR. Network interface 2200 may be embodied as part of a system-on-a-chip (SoC) that includes one or more processors, or included on a multichip package that also contains one or more processors.

Network interface 2200 can include transceiver 2202, processors 2204, transmit queue 2206, receive queue 2208, memory 2210, and interface 2212, and DMA engine 2252. Transceiver 2202 can be capable of receiving and transmitting packets in conformance with the applicable protocols such as Ethernet as described in IEEE 802.3, although other protocols may be used. Transceiver 2202 can receive and transmit packets from and to a network via a network medium (not depicted). Transceiver 2202 can include PHY circuitry 2214 and media access control (MAC) circuitry 2216. PHY circuitry 2214 can include encoding and decoding circuitry (not shown) to encode and decode data packets according to applicable physical layer specifications or standards. MAC circuitry 2216 can be configured to assemble data to be transmitted into packets, that include destination and source addresses along with network control information and error detection hash values. Processors 2204 can be any a combination of a: processor, core, graphics processing unit (GPU), field programmable gate array (FPGA), application specific integrated circuit (ASIC), or other programmable hardware device that allow programming of network interface 2200. For example, processors 2204 can provide for identification of a resource to use to perform a workload and generation of a bitstream for execution on the selected resource. For example, a "smart network interface" can provide packet processing capabilities in the network interface using processors 2204.

Packet allocator 2224 can provide distribution of received packets for processing by multiple CPUs or cores using timeslot allocation described herein or RSS. When packet allocator 2224 uses RSS, packet allocator 2224 can calculate a hash or make another determination based on contents of a received packet to determine which CPU or core is to process a packet.

Interrupt coalesce 2222 can perform interrupt moderation whereby network interface interrupt coalesce 2222 waits for multiple packets to arrive, or for a time-out to expire, before generating an interrupt to host system to process received packet(s). Receive Segment Coalescing (RSC) can be performed by network interface 2200 whereby portions of incoming packets are combined into segments of a packet. Network interface 2200 provides this coalesced packet to an application.

Direct memory access (DMA) engine 2252 can copy a packet header, packet payload, and/or descriptor directly from host memory to the network interface or vice versa, instead of copying the packet to an intermediate buffer at the host and then using another copy operation from the intermediate buffer to the destination buffer. In some embodiments, multiple DMA engines are available for transfer of contents of packets to a destination memory associated with a host device or a destination memory associated with an accelerator device.

Memory 2210 can be any type of volatile or non-volatile memory device and can store any queue or instructions used to program network interface 2200. Transmit queue 2206 can include data or references to data for transmission by network interface. Receive queue 2208 can include data or references to data that was received by network interface from a network. Descriptor queues 2220 can include descriptors that reference data or packets in transmit queue 2206 or receive queue 2208 and corresponding destination memory regions. Interface 2212 can provide an interface with host device (not depicted). For example, interface 2212 can be compatible with PCI, PCI Express, PCI-x, Serial ATA, and/or USB compatible interface (although other interconnection standards may be used).

In some examples, processors 2204 can perform one or more of: large receive offload (LRO), large send/segmentation offload (LSO), TCP segmentation offload (TSO), Transport Layer Security (TLS) offload, receive side scaling (RSS) to allocate a queue or core to process a payload. LRO can refer to reassembling incoming network packets and transfer packet contents (e.g., payloads) into larger contents and transferring the resulting larger contents but fewer packets for access by the host system or a VEE.

LSO can refer to generating a multipacket buffer and providing content of the buffer for transmission. A host device can build a larger TCP message (or other transport layer) (e.g., 64 KB in length) and processors 2204 can segment the message it into smaller data packets for transmission.

TLS is defined at least in The Transport Layer Security (TLS) Protocol Version 1.3, RFC 8446 (August 2018). TLS offload can refer to offload of encryption or decryption of contents in accordance with TLS in processors 2204. Network interface 2200 can receive data for encryption and perform the encryption of data prior to transmission of encrypted data in one or more packets. Network interface 2200 can receive packets and decrypt content of packets prior to transfer of decrypted data to a host system. In some examples, any type of encryption or decryption be performed such as but not limited to Secure Sockets Layer (SSL).

Figure 23:
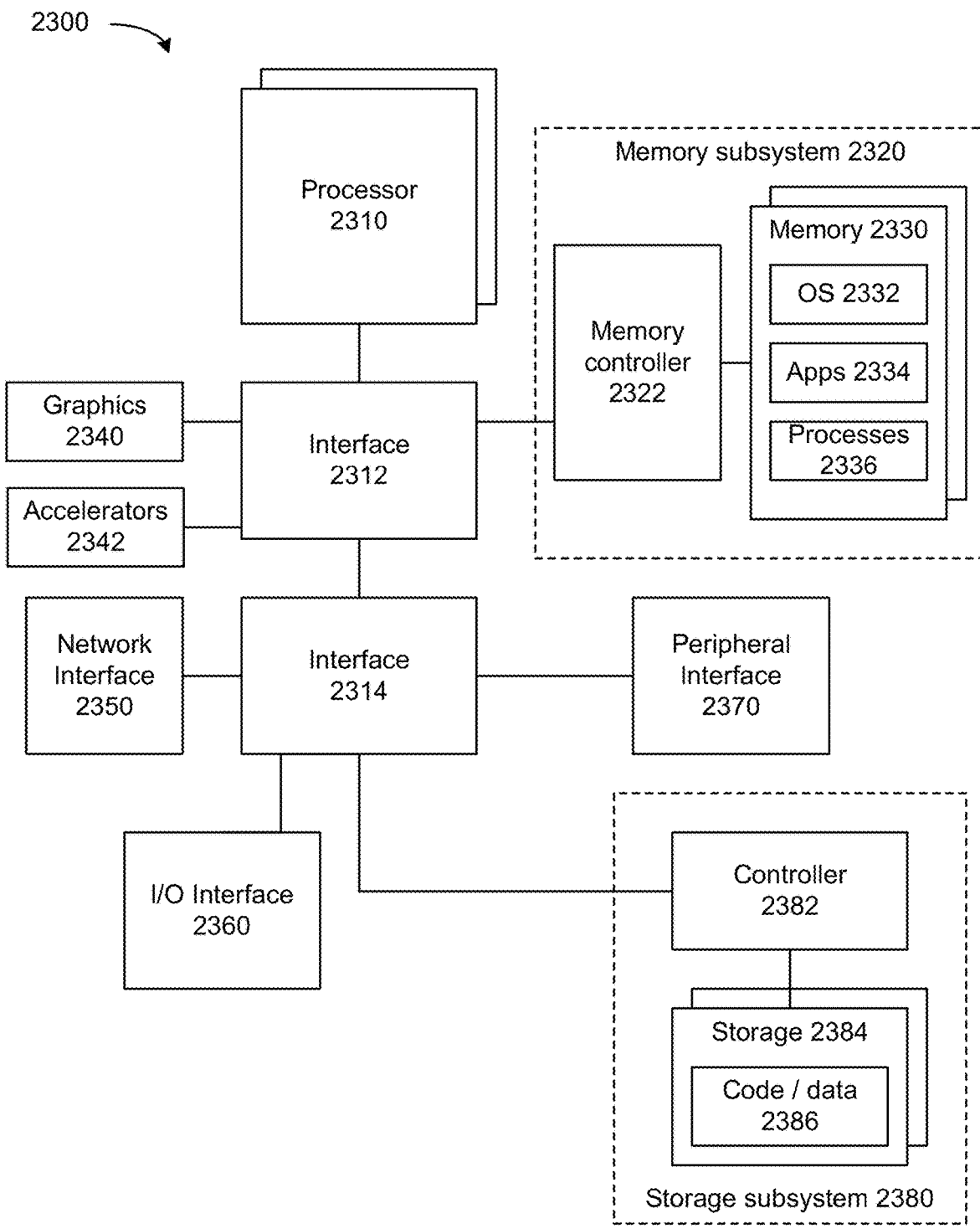
FIG. 23 depicts an example system.

FIG. 23 depicts a system. The system can use embodiments described herein for providing or receiving NVMe commands using a kernel layer or userspace intermediary to provide NVMe-oF capability. System 2300 includes processor 2310, which provides processing, operation management, and execution of instructions for system 2300. Processor 2310 can include any type of microprocessor, central processing unit (CPU), graphics processing unit (GPU), processing core, or other processing hardware to provide processing for system 2300, or a combination of processors. Processor 2310 controls the overall operation of system 2300, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 2300 includes interface 2312 coupled to processor 2310, which can represent a higher speed interface or a high throughput interface for system components that needs higher bandwidth connections, such as memory subsystem 2320, graphics interface components 2340, or accelerators 2342. Interface 2312 represents an interface circuit, which can be a standalone component or integrated onto a processor die. Where present, graphics interface 2340 interfaces to graphics components for providing a visual display to a user of system 2300. In one example, graphics interface 2340 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 2340 generates a display based on data stored in memory 2330 or based on operations executed by processor 2310 or both. In one example, graphics interface 2340 generates a display based on data stored in memory 2330 or based on operations executed by processor 2310 or both.

Accelerators 2342 can be a programmable or fixed function offload engine that can be accessed or used by a processor 2310. For example, an accelerator among accelerators 2342 can provide compression (DC) capability, cryptography services such as public key encryption (PKE), cipher, hash/authentication capabilities, decryption, or other capabilities or services. In some embodiments, in addition or alternatively, an accelerator among accelerators 2342 provides field select controller capabilities as described herein. In some cases, accelerators 2342 can be integrated into a CPU socket (e.g., a connector to a motherboard or circuit board that includes a CPU and provides an electrical interface with the CPU). For example, accelerators 2342 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 2342 can provide multiple neural networks, processor cores, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 2320 represents the main memory of system 2300 and provides storage for code to be executed by processor 2310, or data values to be used in executing a routine. Memory subsystem 2320 can include one or more memory devices 2330 such as read-only memory (ROM), flash memory, one or more varieties of random access memory (RAM) such as DRAM, or other memory devices, or a combination of such devices. Memory 2330 stores and hosts, among other things, operating system (OS) 2332 to provide a software platform for execution of instructions in system 2300. Additionally, applications 2334 can execute on the software platform of OS 2332 from memory 2330. Applications 2334 represent programs that have their own operational logic to perform execution of one or more functions. Processes 2336 represent agents or routines that provide auxiliary functions to OS 2332 or one or more applications 2334 or a combination. OS 2332, applications 2334, and processes 2336 provide software logic to provide functions for system 2300. In one example, memory subsystem 2320 includes memory controller 2322, which is a memory controller to generate and issue commands to memory 2330. It will be understood that memory controller 2322 could be a physical part of processor 2310 or a physical part of interface 2312. For example, memory controller 2322 can be an integrated memory controller, integrated onto a circuit with processor 2310.

While not specifically illustrated, it will be understood that system 2300 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1384 bus.

In one example, system 2300 includes interface 2314, which can be coupled to interface 2312. In one example, interface 2314 represents an interface circuit, which can include standalone components and integrated circuitry. In one example, multiple user interface components or peripheral components, or both, couple to interface 2314. Network interface 2350 provides system 2300 the ability to communicate with remote devices (e.g., servers or other computing devices) over one or more networks. Network interface 2350 can include an Ethernet adapter, wireless interconnection components, cellular network interconnection components, USB (universal serial bus), or other wired or wireless standards-based or proprietary interfaces. Network interface 2350 can transmit data to a remote device, which can include sending data stored in memory. Network interface 2350 can receive data from a remote device, which can include storing received data into memory. Various embodiments can be used in connection with network interface 2350, processor 2310, and memory subsystem 2320.

In one example, system 2300 includes one or more input/output (I/O) interface(s) 2360. I/O interface 2360 can include one or more interface components through which a user interacts with system 2300 (e.g., audio, alphanumeric, tactile/touch, or other interfacing). Peripheral interface 2370 can include any hardware interface not specifically mentioned above. Peripherals refer generally to devices that connect dependently to system 2300. A dependent connection is one where system 2300 provides the software platform or hardware platform or both on which operation executes, and with which a user interacts.

In one example, system 2300 includes storage subsystem 2380 to store data in a nonvolatile manner. In one example, in certain system implementations, at least certain components of storage 2380 can overlap with components of memory subsystem 2320. Storage subsystem 2380 includes storage device(s) 2384, which can be or include any conventional medium for storing large amounts of data in a nonvolatile manner, such as one or more magnetic, solid state, or optical based disks, or a combination. Storage 2384 holds code or instructions and data 2386 in a persistent state (e.g., the value is retained despite interruption of power to system 2300). Storage 2384 can be generically considered to be a "memory," although memory 2330 is typically the executing or operating memory to provide instructions to processor 2310. Whereas storage 2384 is nonvolatile, memory 2330 can include volatile memory (e.g., the value or state of the data is indeterminate if power is interrupted to system 2300). In one example, storage subsystem 2380 includes controller 2382 to interface with storage 2384. In one example controller 2382 is a physical part of interface 2314 or processor 2310 or can include circuits or logic in both processor 2310 and interface 2314.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4 E (DDR version 4), LPDDR3 (Low Power DDR version 3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 2300. More specifically, power source typically interfaces to one or multiple power supplies in system 2300 to provide power to the components of system 2300. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 2300 can be implemented using interconnected compute sleds of processors, memories, storages, network interfaces, and other components. High speed connections can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, DisplayPort, embedded DisplayPort, MIPI, HDMI, and successors or variations thereof.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Example 1 includes any example and includes a method comprising: accessing an initiator as a Non-Volatile Memory Express (NMVe) device, wherein: the initiator is configured with an address space, configured in kernel or user space, for access by a virtualized execution environment, the initiator to copy one or more storage access commands from the virtualized execution environment into a queue for access by a remote direct memory access (RDMA) compatible network interface, and the network interface to provide Non-Volatile Memory Express over Fabrics (NVMe-oF) compatible commands based on the one or more storage access commands to a target storage device.

Example 2 includes any example and includes causing creation of the initiator as a mediated device in kernel space or user space of a host system.

Example 3 includes any example and includes configuring a physical storage pool address of the target storage device for access by the virtualized execution environment by receipt of the physical storage pool address in a configuration command.

Example 4 includes any example and includes configuring the target storage device for access by the virtualized execution environment by receipt of a storage pool internal NVMe Qualified Name in the configuration command.

Example 5 includes any example, wherein a device driver for the network interface is to provide the one or more storage access commands into a queue.

Example 6 includes any example, and includes the initiator copying a response to the one or more storage access commands from a queue written-to by the RDMA compatible network interface to a queue accessible to the virtualized execution environment.

Example 7 includes any example, and includes an apparatus comprising at least one processor comprising a cache, the at least one processor configured to: execute an initiator configured with a storage address space for access by a virtualized execution environment, wherein: the initiator is accessible as a Non-Volatile Memory Express (NMVe) device, the initiator is to copy one or more storage access commands from the virtualized execution environment into a queue for access by a remote direct memory access (RDMA) compatible network interface, and the network interface to provide Non-Volatile Memory Express over Fabrics (NVMe-oF) compatible commands based on the one or more storage access commands to a target storage device.

Example 8 includes any example, wherein the at least one processor is to respond to a request to create the initiator as a mediated kernel layer block in a kernel space or virtual function I/O (VFIO) based user space layer block in user space of a host system.

Example 9 includes any example, wherein a physical storage pool address of the target storage device is configured for access by the virtualized execution environment in a configuration command.

Example 10 includes any example, wherein the target storage device is configured for access by the virtualized execution environment by receipt of a storage pool internal Non-Volatile Memory Express device Qualified Name in the configuration command.

Example 11 includes any example, wherein the at least one processor is to execute a device driver for the network interface and the device driver is to provide the one or more storage access commands into a queue.

Example 12 includes any example, wherein the initiator is to copy a response to the one or more storage access commands from a queue written-to by the RDMA compatible network interface to a queue accessible to the virtualized execution environment.

Example 13 includes any example, and includes: a host computing system comprising one or more memory devices, one or more storage devices, and a rack switch, wherein the host computing system is to store and access data transferred using the initiator.

Example 14 includes any example, and includes: at least one non-transitory computer-readable medium, comprising instructions stored thereon, that if executed by at least one processor, cause the at least one processor to: execute an initiator configured with a storage address space for access by a virtualized execution environment, wherein: the initiator is accessible as a Non-Volatile Memory Express (NMVe) device, the initiator is to copy one or more storage access commands from the virtualized execution environment into a queue for access by a remote direct memory access (RDMA) compatible network interface, and the network interface to provide Non-Volatile Memory Express over Fabrics (NVMe-oF) compatible commands to a target storage device.

Example 15 includes any example, and includes: instructions stored thereon, that if executed by at least one processor, cause the at least one processor to: create the initiator as a mediated kernel layer block in a kernel space or virtual function I/O (VFIO) based layer block in a user space of a host system.

Example 16 includes any example, wherein a physical storage pool address of a target storage device is configured for access by the virtualized execution environment in a configuration command.

Example 17 includes any example, wherein the target storage device is configured for access by the virtualized execution environment by receipt of a storage pool internal Non-Volatile Memory Express Qualified Name in the configuration command.

Example 18 includes any example, and includes: instructions stored thereon, that if executed by at least one processor, cause the at least one processor to: execute a device driver for the network interface, wherein the device driver is to provide the one or more storage access commands into a queue.

Example 19 includes any example, and includes: instructions stored thereon, that if executed by at least one processor, cause the at least one processor to: cause the initiator to copy a response to the one or more storage access commands from a queue written-to by the RDMA compatible network interface to a queue accessible to the virtualized execution environment.

Example 20 includes any example, wherein RDMA comprises use of a send queue (SQ) to transfer work requests to the RDMA compatible network interface and a receive queue (RQ) to receive an RDMA-based command or RDMA-based response.

What is claimed is:

1. A method comprising:
causing creation of a processor-executed initiator as a mediated device in kernel space of a host system, wherein the initiator comprises a virtual function I/O (VFIO) based user space layer block in user space of the host system;
the processor-executed initiator copying one or more storage access commands from a virtualized execution environment into a queue for access by a remote direct memory access (RDMA) compatible network interface, wherein
a hypervisor, executing in user space, that utilizes a driver and an interface for communication between the virtualized execution environment and the processor-executed initiator,
the initiator is accessible as a Non-Volatile Memory Express (NVMe) device, and
the initiator is configured with an address space configured solely in the kernel space for access by the virtualized execution environment; and
the network interface transmitting NVMe-oF compatible commands, based on the one or more storage access commands, to a target storage device.

2. The method of claim 1, comprising:
configuring a physical storage pool address of the target storage device for access by the virtualized execution environment by receipt of the physical storage pool address in a configuration command.

3. The method of claim 1, comprising:
configuring the target storage device for access by the virtualized execution environment by receipt of a storage pool internal NVMe Qualified Name in a configuration command.

4. The method of claim 1, wherein a device driver for the network interface is to provide the one or more storage access commands into a queue.

5. The method of claim 1, comprising:
the initiator copying a response to the one or more storage access commands from a queue written-to by the RDMA compatible network interface to a queue accessible to the virtualized execution environment.

6. An apparatus comprising:
at least one processor comprising a cache, wherein the at least one processor is configured to:
execute an initiator configured with a storage address space for access, solely in user space, by a virtualized execution environment and
execute a hypervisor, in user space, to associate the virtualized execution environment with the initiator, wherein:
the initiator is created as a virtual function I/O (VFIO) based user space layer block in the user space of a host system,
the initiator is accessible as a Non-Volatile Memory Express (NVMe) device by an NVMe driver and interface,
the initiator is to copy one or more storage access commands from the virtualized execution environment into a queue for access by a remote direct memory access (RDMA) compatible network interface, and
the network interface is to provide NVMe-oF compatible commands based on the one or more storage access commands to a target storage device.

7. The apparatus of claim 6, wherein a physical storage pool address of the target storage device is configured for access by the virtualized execution environment in a configuration command.

8. The apparatus of claim 7, wherein the target storage device is configured for access by the virtualized execution environment by receipt of a storage pool internal Non-Volatile Memory Express device Qualified Name in the configuration command.

9. The apparatus of claim 7, wherein the at least one processor is to execute a device driver for the network interface and the device driver is to provide the one or more storage access commands into a queue.

10. The apparatus of claim 6, wherein the initiator is to copy a response to the one or more storage access commands from a queue written-to by the RDMA compatible network interface to a queue accessible to the virtualized execution environment.

11. The apparatus of claim 6, comprising: a host computing system comprising one or more memory devices, one or more storage devices, and a rack switch, wherein the host computing system is to store and access data transferred using the initiator.

12. At least one non-transitory computer-readable medium, comprising instructions stored thereon, that if executed by at least one processor, cause the at least one processor to:
execute an initiator configured with a storage address space for access, solely in kernel space, by a virtualized execution environment;
create the initiator as a mediated kernel layer block in the kernel space, wherein the initiator comprises a virtual function I/O (VFIO) based user space layer block in user space of a host system;
execute a hypervisor, in user space, to associate the virtualized execution environment with the initiator; and
execute a driver and interface, in user space, wherein:
the initiator is accessible as a Non-Volatile Memory Express (NVMe) device by the driver and the interface,
the initiator is to copy one or more storage access commands from the virtualized execution environment into a queue for access by a remote direct memory access (RDMA) compatible network interface, and
the network interface to provide NVMe-oF compatible commands to a target storage device.

13. The at least one computer-readable medium of claim 12, wherein a physical storage pool address of a target storage device is configured for access by the virtualized execution environment in a configuration command.

14. The at least one computer-readable medium of claim 13, wherein the target storage device is configured for access by the virtualized execution environment by receipt of a storage pool internal Non-Volatile Memory Express Qualified Name in the configuration command.

15. The at least one computer-readable medium of claim 12, comprising instructions stored thereon, that if executed by at least one processor, cause the at least one processor to:
    execute a device driver for the network interface, wherein the device driver is to provide the one or more storage access commands into a queue.

16. The at least one computer-readable medium of claim 12, comprising instructions stored thereon, that if executed by at least one processor, cause the at least one processor to:
    cause the initiator to copy a response to the one or more storage access commands from a queue written-to by the RDMA compatible network interface to a queue accessible to the virtualized execution environment.

17. The at least one computer-readable medium of claim 12, wherein RDMA comprises use of a send queue (SQ) to transfer work requests to the RDMA compatible network interface and a receive queue (RQ) to receive an RDMA-based command or RDMA-based response.

* * * * *